(12) United States Patent
Kim et al.

(10) Patent No.: US 11,497,079 B2
(45) Date of Patent: Nov. 8, 2022

(54) METHOD AND APPARATUS FOR PERFORMING DISCONTINUOUS RECEPTION IN WIRELESS COMMUNICATION SYSTEM

(71) Applicant: Samsung Electronics Co., Ltd., Gyeonggi-do (KR)

(72) Inventors: Sangbum Kim, Gyeonggi-do (KR); Alexander Sayenko, Gyeonggi-do (KR); Seungri Jin, Gyeonggi-do (KR); Soenghun Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 25 days.

(21) Appl. No.: 17/043,234

(22) PCT Filed: Mar. 27, 2019

(86) PCT No.: PCT/KR2019/003593
§ 371 (c)(1),
(2) Date: Sep. 29, 2020

(87) PCT Pub. No.: WO2019/190205
PCT Pub. Date: Oct. 3, 2019

(65) Prior Publication Data
US 2021/0022202 A1 Jan. 21, 2021

(30) Foreign Application Priority Data
Mar. 29, 2018 (KR) .................. 10-2018-0036905

(51) Int. Cl.
*H04W 76/28* (2018.01)
*H04W 76/27* (2018.01)
*H04W 52/02* (2009.01)

(52) U.S. Cl.
CPC ....... *H04W 76/28* (2018.02); *H04W 52/0225* (2013.01); *H04W 76/27* (2018.02)

(58) Field of Classification Search
CPC . H04W 76/28; H04W 52/0225; H04W 76/27; H04W 68/025; H04W 76/25;
(Continued)

(56) References Cited

U.S. PATENT DOCUMENTS

2017/0325281 A1 11/2017 Hong et al.
2017/0332419 A1 11/2017 Kim et al.
(Continued)

FOREIGN PATENT DOCUMENTS

KR 1020170125292 11/2017
KR 1020170128042 11/2017
(Continued)

OTHER PUBLICATIONS

PCT/ISA/210 Search Report issued on PCT/KR2019/0035931, dated Jul. 5, 2019, pp. 5.
(Continued)

*Primary Examiner* — Walli Z Butt
(74) *Attorney, Agent, or Firm* — The Farrell Law Firm, P.C.

(57) ABSTRACT

The present disclosure relates to a 5th generation (5G) or pre-5G communication system for supporting a data transmission rate higher than that of a 4th generation (4G) communication system such as long term evolution (LTE). The present disclosure provides a method and an apparatus for performing discontinuous reception (DRX) in a wireless communication system. An operating method of a user equipment (UE) in a wireless communication system includes detecting a wake-up signal (WUS), and determining whether to a physical downlink control channel (PDCCH) or a paging message for a specific time occasion based on the WUS.

8 Claims, 22 Drawing Sheets

(58) Field of Classification Search
CPC ......... H04W 52/0229; H04W 52/0216; H04W 52/0212; H04W 52/0248; Y02D 30/70
See application file for complete search history.

(56) References Cited

U.S. PATENT DOCUMENTS

| | | | |
|---|---|---|---|
| 2018/0014306 A1 | 1/2018 | Dinan | |
| 2019/0150221 A1* | 5/2019 | Tseng | H04W 76/27 370/331 |
| 2019/0191483 A1 | 6/2019 | Ryoo et al. | |
| 2019/0223153 A1 | 7/2019 | Kim | |
| 2020/0022106 A1 | 1/2020 | Kim et al. | |
| 2020/0120741 A1* | 4/2020 | Lindheimer | H04W 68/08 |

FOREIGN PATENT DOCUMENTS

| | | |
|---|---|---|
| KR | 1020180018455 | 2/2018 |
| KR | 1020180020168 | 2/2018 |
| KR | 1020180029799 | 3/2018 |
| KR | 1020180108388 | 10/2018 |
| WO | WO 2016/146147 | 9/2016 |
| WO | WO 2017/200477 | 11/2017 |
| WO | WO-2019190383 A1 * 10/2019 ............ H04W 24/10 |  |

OTHER PUBLICATIONS

PCT/ISA/237 Written Opinion issued on PCT/KR2019/003593, dated Jul. 5, 2019, pp. 9.
Samsung, 3GPP TSG-RAN WG2#101, R2-1803430, Athens, Greece, Feb. 26-Mar. 2, 2018, Common Security framework for Resume and Re-establishment, pp. 5.
Ericsson, "NR RRC States Overviewand Remaining Open Issues", R2-1713301, 3GPP TSG-RAN WG2 #100, Nov. 27-Dec. 1, 2017, 15 pages.
European Search Report dated Apr. 14, 2021 issued in counterpart application No. 19776783.3-1205, 9 pages.
Ericsson, "DRX with Short onDuration and Wake-up Signaling", R2-1803189, 3GPP TSG-RAN WG2 #101, Feb. 26-Mar. 2, 2018, 3 pages.
Korean Office Action dated Jan. 12, 2022 issued in counterpart application No. 10-2018-0036905, 10 pages.
Indian Examination Report dated Jul. 14, 2022 issued in counterpart application No. 202037045865, 6 pages.
KR Notice of Patent Grant dated Jul. 29, 2022 issued in counterpart application No. 10-2018-0036905, 4 pages.

* cited by examiner

METHOD AND APPARATUS FOR PERFORMING DISCONTINUOUS RECEPTION IN WIRELESS COMMUNICATION SYSTEM

PRIORITY

This application is a National Phase Entry of International Application No. PCT/KR2019/003593, which was filed on Mar. 27, 2019, and claims priority to Korean Patent Application No. 10-2018-0036905, filed in the Korean Intellectual Property Office on Mar. 29, 2018, the content of each of which is incorporated herein by reference.

TECHNICAL FIELD

The present disclosure generally relates to a wireless communication system, and more particularly, to an apparatus and a method for performing discontinuous reception (DRX) in a wireless communication system.

BACKGROUND ART

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its implementation in an extremely high frequency (mmWave) band (e.g., 60 GHz band). To mitigate a path loss of radio waves and to extend a propagation distance of radio waves in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is working on hybrid frequency shift keying and quadrature amplitude modulation (FQAM) and sliding window superlocation coding (SWSC) as advanced coding modulation (ACM) schemes, and filter bank multi carrier (FBMC), non-orthogonal multiple access (NOMA), and sparse code multiple access (SCMA) as advanced access technologies.

DISCLOSURE OF INVENTION

Technical Problem

Based on the discussions described above, the present disclosure provides an apparatus and a method for effectively performing discontinuous reception (DRX) in a wireless communication system.

Solution to Problem

According to various embodiments of the present disclosure, an operating method of a user equipment (UE) in a wireless communication system includes detecting a wake-up signal (WUS), and determining whether to a physical downlink control channel (PDCCH) or a paging message for a specific time occasion based on the WUS.

According to various embodiments of the present disclosure, an apparatus of a UE in a wireless communication system includes a transceiver; and at least one processor, wherein the at least one processor is configured to detect a WUS, and determine whether to a PDCCH or a paging message for a specific time occasion based on the WUS.

Advantageous Effects of Invention

An apparatus and a method according to various embodiments of the present disclosure, may enable to effectively perform discontinuous reception (DRX) in a wireless communication system.

Effects obtainable from the present disclosure are not limited to the above-mentioned effects, and other effects which are not mentioned may be clearly understood by those skilled in the art of the present disclosure from the following descriptions.

BEST MODE FOR CARRYING OUT THE INVENTION

Terms used in the present disclosure are used for describing particular embodiments, and are not intended to limit the scope of other embodiments. A singular form may include a plurality of forms unless it is explicitly differently represented. All the terms used herein, including technical and scientific terms, may have the same meanings as terms generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the present disclosure.

Hereafter, the present disclosure relates to an apparatus and a method for transmitting a wake-up signal (WUS) in a wireless communication system. Terms indicating communication schemes, terms indicating signals, terms indicating information, terms indicating network entities, and terms indicating components of an apparatus, which are used in the following descriptions, are for the sake of explanations. Accordingly, the present disclosure is not limited to the terms to be described, and may use other terms having technically identical meaning.

In addition, the present disclosure describes various embodiments using terms used in some communication standard (e.g., 3rd generation partnership project (3GPP)), which are merely exemplary for explanations. Various embodiments of the present disclosure may be easily modified and applied also in other communication systems.

Figure 1:
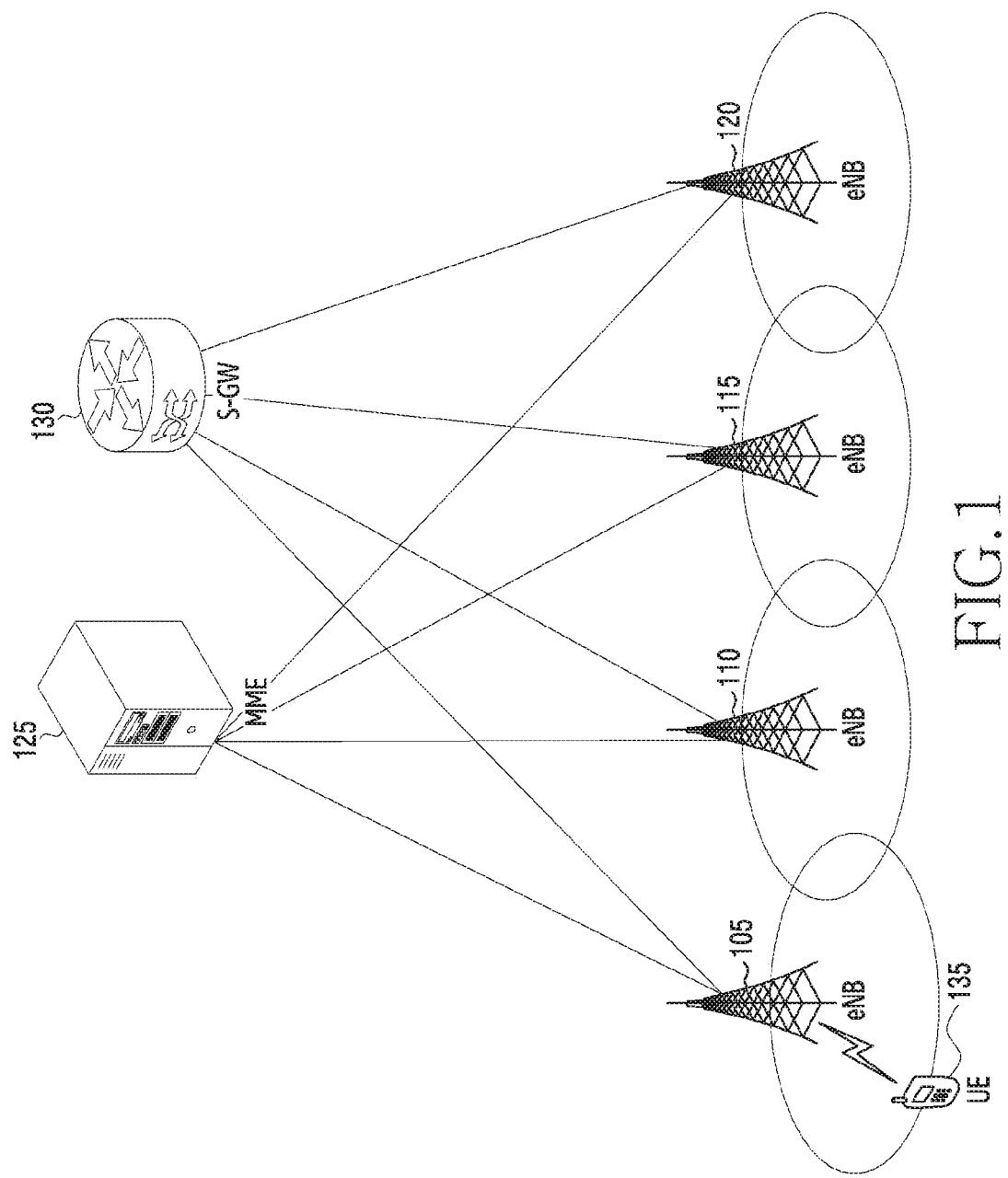
FIG. 1 illustrates an example of a wireless communication system according to various embodiments of the present disclosure.

FIG. 1 illustrates an example of a wireless communication system according to various embodiments of the present disclosure. Specifically, FIG. 1 illustrates a structure of an LTE system.

Referring to FIG. 1, a radio access network of the LTE system as shown includes evolved node Bs, eNBs, Node Bs, or base stations 105, 110, 115, and 120 and a mobility management entity (MME) 125 and a serving-gateway (S-GW) 130. A user equipment (UE) or a terminal 135 accesses an external network via the eNB 105, 110, 115, and 120 and the S-GW 130.

In FIG. 1, the eNB 105, 110, 115, and 120 corresponds to an existing Node B of a universal mobile telecommunications system (UMTS) system. The eNB 105 is connected to the UE 135 over a radio channel and performs a more complicated role than the existing Node B. Since every user traffic including a real-time service such as voice over internet protocol (VoIP) over Internet protocol is serviced over a shared channel in the LTE system, a device for collecting and scheduling status information such as buffer state, available transmit power state, and channel state of the UEs, which is managed by the eNB 105, 110, 115, and 120. One eNB typically controls a plurality of cells. For example, to implement a transmission rate of 100 Mbps, the LTE system uses orthogonal frequency division multiplexing (OFDM) as the radio access technology, for example, in a 20 MHz bandwidth. In addition, it applies an adaptive modulation & coding (AMC) scheme which determines a modulation scheme and a channel coding rate according to the channel state of the UE. The S-GW 130 is a device for providing a data bearer, and generates or removes the data bearer under control of the MME 125. The MME is a device which manages various control functions as well as mobility management function for the UE and is connected to a plurality of eNBs.

Figure 2:
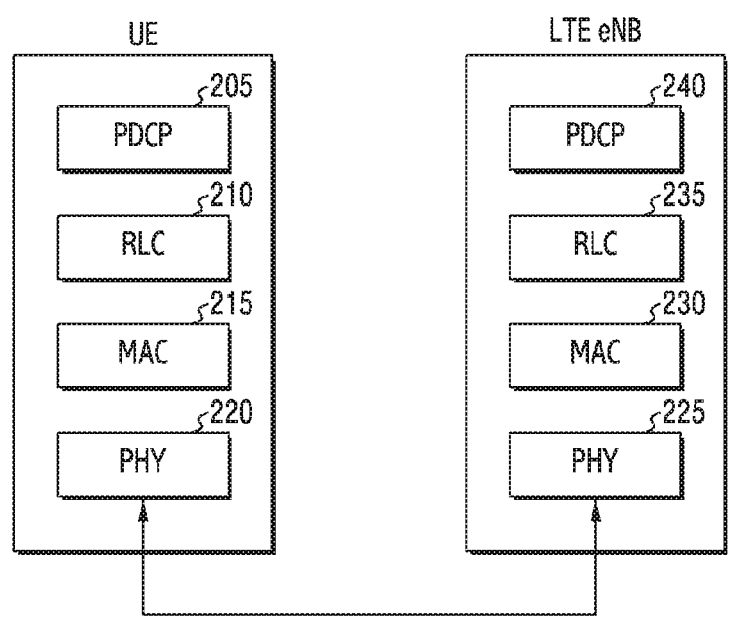
FIG. 2 illustrates an example of a radio protocol architecture of a wireless communication system according to various embodiments of the present disclosure.

FIG. 2 illustrates an example of a radio protocol architecture of a wireless communication system according to various embodiments of the present disclosure. Specifically, FIG. 2 illustrates the radio protocol architecture in the LTE system.

Referring to FIG. 2, the radio protocol of the LTE system includes a packet data convergence protocol (PDCP) layer 205 and 240, a radio link control (RLC) layer 210 and 235, a medium access control (MAC) layer 215 and 230 and a physical (PHY) layer 220 and 225 in the UE and the eNB respectively.

The PDCP layer 205 and 240 manages operations such as IP header compression/recovery. Main functions of the PDCP are summarized as follows.

Header compression and decompression (ROHC only)

Transfer of user data

In-sequence delivery of upper layer PDUs at PDCP re-establishment procedure for RLC AM For split bearers in DC (only support for RLC AM): PDCP PDU routing for transmission and PDCP PDU reordering for reception Duplicate detection of lower layer SDUs at PDCP re-establishment procedure for RLC AM Retransmission of PDCP SDUs at handover and, split bearers in DC, of PDCP PDUs at PDCP data-recovery procedure, for RLC AM Ciphering and deciphering Timer-based SDU discard in uplink The RLC layer 210 and 235 performs an automatic repeat request (ARQ) operation by reconfiguring a PDCP packet data unit (PDU) in an appropriate size. Main functions of the RLC are summarized as follows.

Transfer of upper layer PDUs

Error Correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer 215 and 230 is connected to several RLC layer devices configured in one UE, and performs operations of multiplexing RLC PDUs into a MAC PDU and demultiplexing RLC PDUs from a MAC PDU. Main functions of the MAC are summarized as follows.

Mapping between logical channels and transport channels

Multiplexing/demultiplexing of MAC SDUs belonging to one or different logical channels into/from transport blocks (TB) delivered to/from the physical layer on transport channels Scheduling information reporting HARQ function (Error correction through HARQ)

Priority handling between logical channels of one UE

Priority handling between UEs by means of dynamic scheduling

MBMS service identification

Transport format selection

Padding

The PEW layer 220 and 225 channel-codes and modulates higher layer data, and generates and transmits an OFDM symbol to a radio channel, or demodulates, channel-decodes, and transmits an OFDM symbol received over the radio channel to a higher layer.

Figure 3:
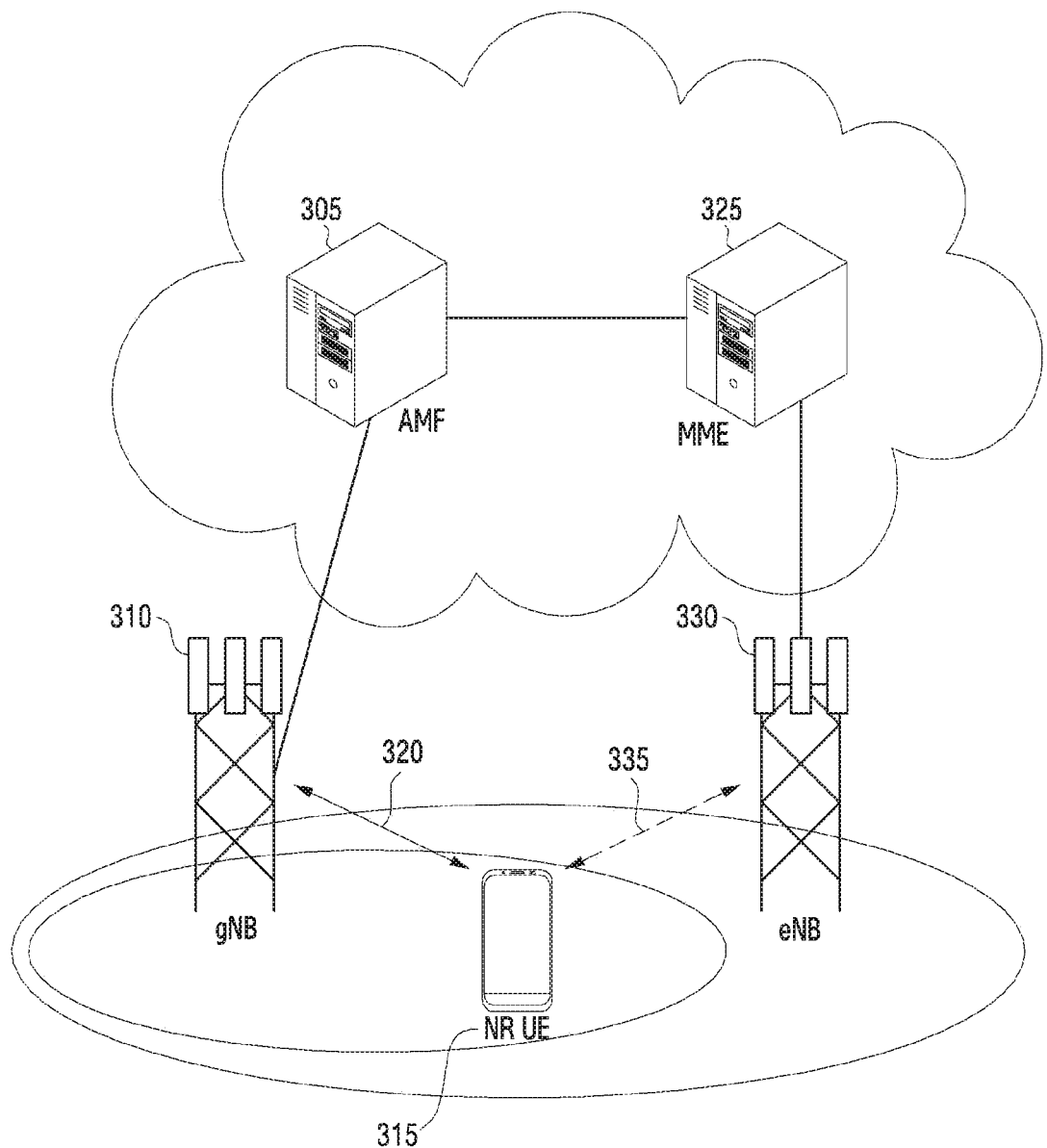
FIG. 3 illustrates an example of a structure of a wireless communication system according to various embodiments of the present disclosure.

FIG. 3 illustrates an example of a wireless communication system according to various embodiments of the present disclosure. Specifically, FIG. 3 illustrates a structure of new radio (NR) suggested in the present disclosure.

Referring to FIG. 3, a radio access network of the NR includes a new radio node B (gNB) 310 and a new radio core network (AMF) 305. A NR UE or terminal 315 accesses to an external network via the gNB 310 and the AMF 305.

The gNB 310 corresponds to the eNB of the existing LTE system. The gNB 310 is connected to the NR UE over a radio channel and may provide a better service than the existing eNB 320. Since every user traffic is serviced over a shared channel in the NR, a device for collecting and scheduling status information such as buffer state, available transmit power state, and channel state of the UEs, which is managed by the gNB 310. One gNB 310 typically controls a plurality of cells. It may have more than the existing maximum bandwidth to implement high-speed data transmission compared with the existing LTE, and adopt beamforming technology in addition to the OFDM as the radio access technique. In addition, it applies an adaptive modulation & coding (AMC) scheme which determines a modulation scheme and a channel coding rate according to the channel state of the UE. The AMF 305 performs functions such as mobility support, bearer setup, and QoS setup. The AMF is a device which manages various control functions as well as mobility management function for the UE and is connected to a plurality of gNBs. In addition, the NR may interwork with the existing LTE system, and the AMF is connected to the MME 325 through a network interface. The MME 325 is connected to an eNB 330 which is the existing eNB. The UE 315 supporting LTE-NR dual connectivity may transmit and receive data 335, while maintaining connections to the eNB 330 as well as the gNB 310.

Figure 4:
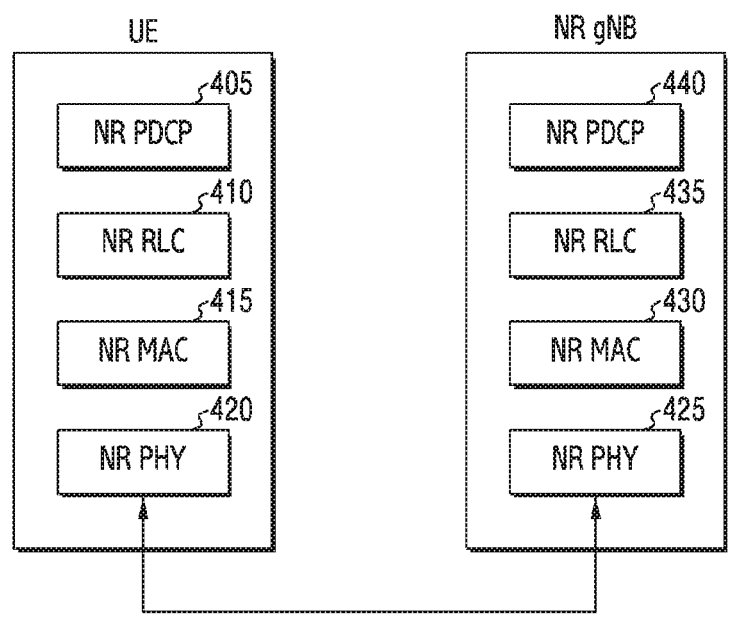
FIG. 4 illustrates an example of a radio protocol architecture of a wireless communication system according to various embodiments of the present disclosure.

FIG. 4 illustrates an example of a radio protocol architecture of a wireless communication system according to various embodiments of the present disclosure. Specifically, FIG. 4 illustrates the radio protocol structure of the NR suggested in the present disclosure.

Referring to FIG. 4, the radio protocol of the NR includes an NR PDCP layer 405 and 440, an NR RLC layer 410 and 435, an NR MAC layer 415 and 430, and an NR PRY layer 420 in the UE and the NR gNB respectively.

Main function of the NR PDCP layer 405 and 440 may include some of the following functions.

Header compression and decompression (ROHC only)

Transfer of user data

In-sequence delivery of upper layer PDUs

PDCP PDU reordering for reception

Duplicate detection of lower layer SDUs

Retransmission of PDCP SDUs

Ciphering and deciphering

Timer-based SDU discard in uplink

The reordering function of the NR PDCP device indicates a function of reordering PDCP PDUs received from a lower layer based on a PDCP sequence number (SN), may include a function for delivering data to an upper layer in sequence, may include a function for reordering and recording missing PDCP PDUs, may include a function for transmitting state report of the missing PDCP PDUs to a transmitting side, and may include a function for requesting retransmission for the missing PDCP PDUs.

Main functions of the NR RLC layer 410 and 435 may include some of the following functions.

Transfer of upper layer PDUs

In-sequence delivery of upper layer PDUs

Out-of-sequence delivery of upper layer PDUs

Error Correction through ARQ

Concatenation, segmentation and reassembly of RLC SDUs

Re-segmentation of RLC data PDUs

Reordering of RLC data PDUs

Duplicate detection

Protocol error detection

RLC SDU discard function

RLC re-establishment

The in-sequence delivery of the NR RLC device indicates a function of delivering RLC PDUs is received from a lower layer to an upper layer in a sequence, if one RLC SDU is segmented and received in multiple RLC SDUs, may include a function of reassembling and delivering them, may include a function of reordering the received RLC PDUs based on the RLC SN or a PDCP SN, may include a function of reordering and recording missing PDCP PDUs, may include a function of a state report of the missing RLC PDUs to the transmitting side, may include a function of requesting retransmission of the missing RLC PDUs, if there is a missing RLC SDU, may include a function of delivering only RLC SDUs before the missing RLC SDU to the upper layer in sequence, or may include a function of delivering all RLC SDUs received before a timer starts to the upper layer in sequence if a specific timer is expired although there is the missing RLC SDU, or may include a function of delivering all RLC SDUs currently received to the upper layer in sequence if a specific timer is expired although there is the missing RLC SDU. The out-of-sequence delivery of the NR RLC device indicates a function of delivering RLC SDUs received from the lower layer directly to the upper layer regardless of the sequence, if one RLC SDU is segmented and received in multiple RLC SDUs, may include a function of reassembling and delivering them, and may include a function of storing the RLC SN or the PDCP SN of the received RLC PDUs, ordering them, and recording missing RLC PDUs.

The NR MAC layer 415 and 430 may be connected to several NR RLC layer devices configured in one UE, and main functions of the NR MAC may include some of the following functions.

Mapping between logical channels and transport channels
Multiplexing/demultiplexing of MAC SDUs
Scheduling information reporting
HARQ function (Error correction through HARQ)
Priority handling between logical channels of one UE
Priority handling between UEs by means of dynamic scheduling
MBMS service identification
Transport format selection
Padding The NR physical layer 420 and 425 may perform operations of channel-coding and modulating upper layer data, generating and transmitting an OFDM symbol over a wireless channel, or demodulating, channel-decoding and delivering an OFDM symbol received over the wireless channel to the upper layer.

Although not depicted in FIG. 4, a radio resource control (RRC) layer is present above the PDCP layer of the UE and the gNB, and the RRC layer may exchange connection and measurement related configuration control message for radio resource control.

Figure 5:
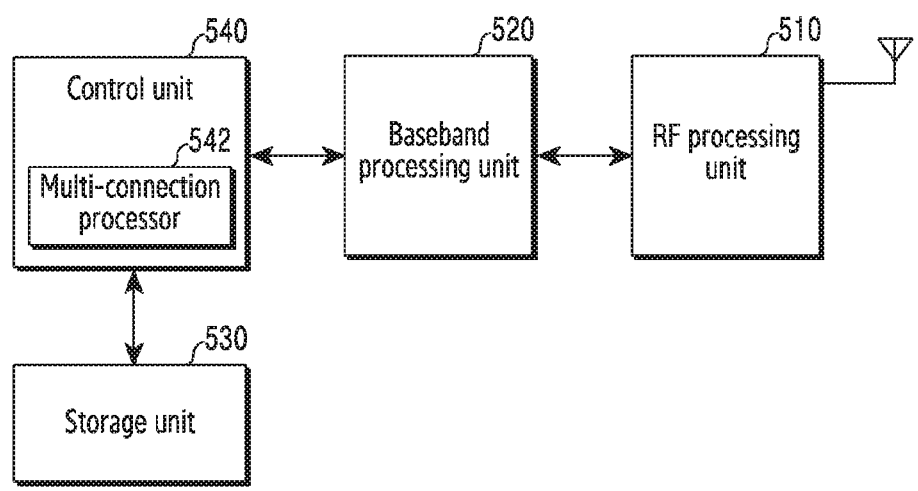
FIG. 5 is a block diagram illustrating a configuration of a user equipment (UE) according to various embodiments of the present disclosure.

FIG. 5 is a block diagram illustrating a configuration of a UE according to various embodiments of the present disclosure.

Referring to FIG. 5, the UE includes a radio frequency (RF) processing unit 510, a baseband processing unit 520, a storage unit 530, and a control unit 540.

The RF processing unit 510 may perform a function for transmitting and receiving a signal through a radio channel, such as signal band conversion and amplification. That is, the RF processing unit 510 may up-convert a baseband signal provided from the baseband processing unit 520 into an RF band signal and then transmit via an antenna, and down-convert an RF band signal received through the antenna into a baseband signal. For example, the RF processing unit 510 may include a transmit filter, a receive filter, an amplifier, a mixer, an oscillator, a digital-to-analog converter (DAC), an analog-to-digital converter (ADC), and so on. Although only one antenna is depicted in FIG. 5, the UE may include a plurality of antennas. In addition, the RF processing unit 510 may include a plurality of RF chains. Further, the RF processing unit 510 may perform beamforming. For the beamforming, the RF processing unit 510 may adjust phases and sizes of signals transmitted or received through the plurality of antennas or antenna elements. Further, the RF processing unit may perform multi input multi output (MIMO), and receive several layers during the MIMO operation.

The baseband processing unit 520 performs a conversion function between the baseband signal and the bit string according to a physical layer standard of the system. For example, in data transmission, the baseband processing unit 520 generates complex symbols by encoding and modulating a transmit bit string. In addition, in data reception, the baseband processing unit 520 restores the received bit string by demodulating and decoding the baseband signal provided from the RF processing unit 510. For example, according to the OFDM scheme, in the data transmission, the baseband processing unit 520 generates complex symbols by encoding and modulating a transmit bit string, maps the complex symbols to subcarriers, and then generates OFDM symbols through inverse fast Fourier transform (IFFT) operation and cyclic prefix (CP) insertion. In addition, in the data reception, the baseband processing unit 520 divides the baseband signal provided from the RF processing unit 510 to OFDM symbol units, restores signals mapped to subcarriers through FFT operation, and restores the received bit string through demodulation and decoding.

The baseband processing unit 520 and the RF processing unit 510 transmit and receive signals as described above. Accordingly, the baseband processing unit 520 and the RF processing unit 510 may be referred to as a transmitting unit, a receiving unit, a transmitting and receiving unit, a transceiver, or a communication unit. Further, at least one of the baseband processing unit 520 and the RF processing unit 510 may include a plurality of communication modules to support a plurality of different radio access technologies. In addition, at least one of the baseband processing unit 520 and the RF processing unit 510 may include different communication modules for processing signals of different frequency bands. For example, the different radio access technologies may include a wireless LAN (e.g., institute of electrical and electronics engineers (IEEE) 802.11), a cellular network (e.g., LTE), and the like. In addition, the different frequency bands may include a super high frequency (SHF) (e.g., 2.NRHz, NRhz) band, and a millimeter wave (e.g., 60 GHz) band.

The storage unit 530 stores data such as a basic program for the operation of the UE, an application program, and setting information. In particular, the storage unit 530 may store information related to a second access node which performs wireless communication using a second radio access technology. The storage unit 530 provides the stored data according to a request of the control unit 540.

The control unit 540 controls overall operations of the UE. For example, the control unit 540 transmits and receives a signal through the baseband processing unit 520 and the RF processing unit 510. In addition, the control unit 540 records and reads data in and from the storage 540. For doing so, the control unit 540 may include at least one processor. For example, the control unit 540 may include a communication processor (CP) for controlling the communication and an application processor (AP) for controlling a higher layer such as an application program. In addition, the control unit 540 may include a multi-connection processor 542.

Figure 6:
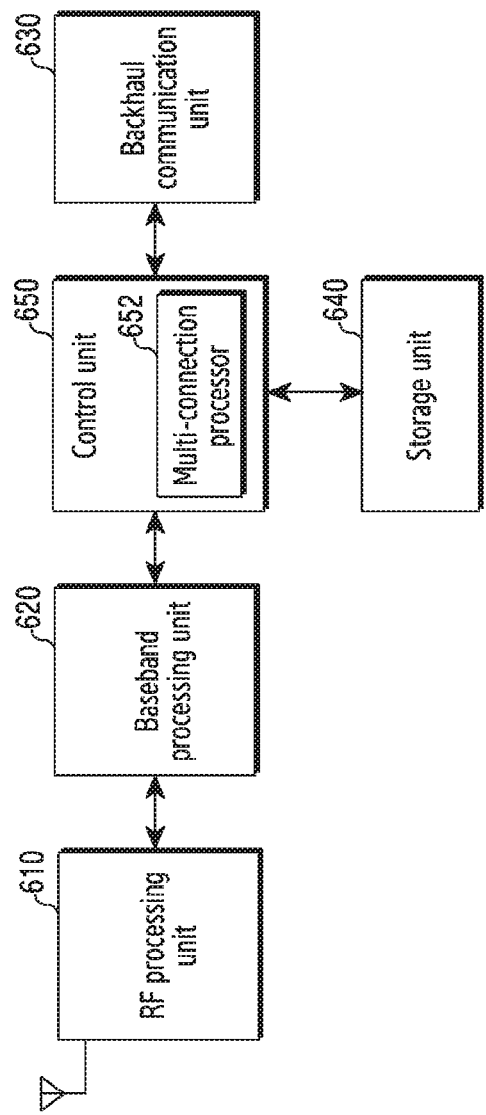
FIG. 6 is a block diagram illustrating a configuration of an evolved node B (eNB) according to various embodiments of the present disclosure.

FIG. 6 is a block diagram illustrating a configuration of an eNB according to various embodiments of the present disclosure.

Referring to FIG. 6, the eNB includes an RF processing unit 610, a baseband processing unit 620, a backhaul communication unit 630, a storage unit 640, and a control unit 650.

The RF processing unit 610 may perform a function for transmitting and receiving a signal through a radio channel, such as signal band conversion and amplification. That is, the RF processing unit 610 up-converts a baseband signal provided from the baseband processing unit 620 to an RF band signal and then transmits via an antenna, and down-converts RF band signal received through the antenna to a baseband signal. For example, the RF processing unit 610 may include a transmit filter, a receive filter, an amplifier, a mixer, an oscillator, a DAC, an ADC, and so on. Although only one antenna is depicted in FIG. 6 a first access node may include a plurality of antennas. In addition, the RF processing unit 610 may include a plurality of RF chains. Further, the RF processing unit 610 may perform beamforming. For the beamforming, the RF processing unit 610 may adjust phases and sizes of signals transmitted or received through the plurality of antennas or antenna elements. The RF processing unit may perform a downlink MIMO operation by transmitting one or more layers.

The baseband processing unit 620 performs a conversion function between the baseband signal and the bit string according to a physical layer standard of a first radio access technology. For example, in data transmission, the baseband processing unit 620 generates complex symbols by encoding and modulating a transmit bit string. In addition, in data reception, the baseband processing unit 620 restores the received bit string by demodulating and decoding the baseband signal provided from the RF processing unit 610. For example, according to the OFDM scheme, in the data transmission, the baseband processing unit 620 generates complex symbols by encoding and modulating a transmit bit string, maps the complex symbols to subcarriers, and then generates OFDM symbols through IFFT operation and CP insertion. In addition, in the data reception, the baseband processing unit 620 divides the baseband signal provided from the RF processing unit 610 into OFDM symbol units, restores signals mapped to subcarriers through FFT operation, and restores the received bit string through demodulation and decoding. The baseband processing unit 620 and the RF processing unit 610 transmit and receive signals as described above. Accordingly, the baseband processing unit 620 and the RF processing unit 610 may be referred to as a transmitting unit, a receiving unit, a transmitting and receiving unit, a transceiver, or a communication unit.

The backhaul communication unit 630 provides an interface for communicating with other nodes in the network. That is, the backhaul communication unit 630 converts a bit string transmitted from a primary base station to another node, for example, an auxiliary base station or a core network, into a physical signal, and converts a physical signal received from the another node into a bit string.

The storage unit 640 stores data such as a basic program for the operation of the primary base station, an application program, and setting information. In particular, the storage unit 640 may store information related to a bearer allocated to the connected UE, measurement result reported from the connected UE, and so on. Further, the storage unit 640 may store information which becomes a basis of determining whether to provide or suspend a multi-connection to the UE. The storage unit 640 provides the stored data according to a request of the control unit 650.

The control unit 650 controls overall operations of the primary base stations. For example, the control unit 650 transmits and receives a signal through the baseband processing unit 620 and the RF processing unit 610 or the backhaul communication unit 630. In addition, the control unit 650 records and reads data in and from the storage unit 640. For doing so, the control unit 650 may include at least one processor. For example, the control unit 650 may include a CP for controlling the communication and an AP for controlling a higher layer such as an application program. In addition, the control unit 650 may include a multi-connection processor 652.

Figure 7:
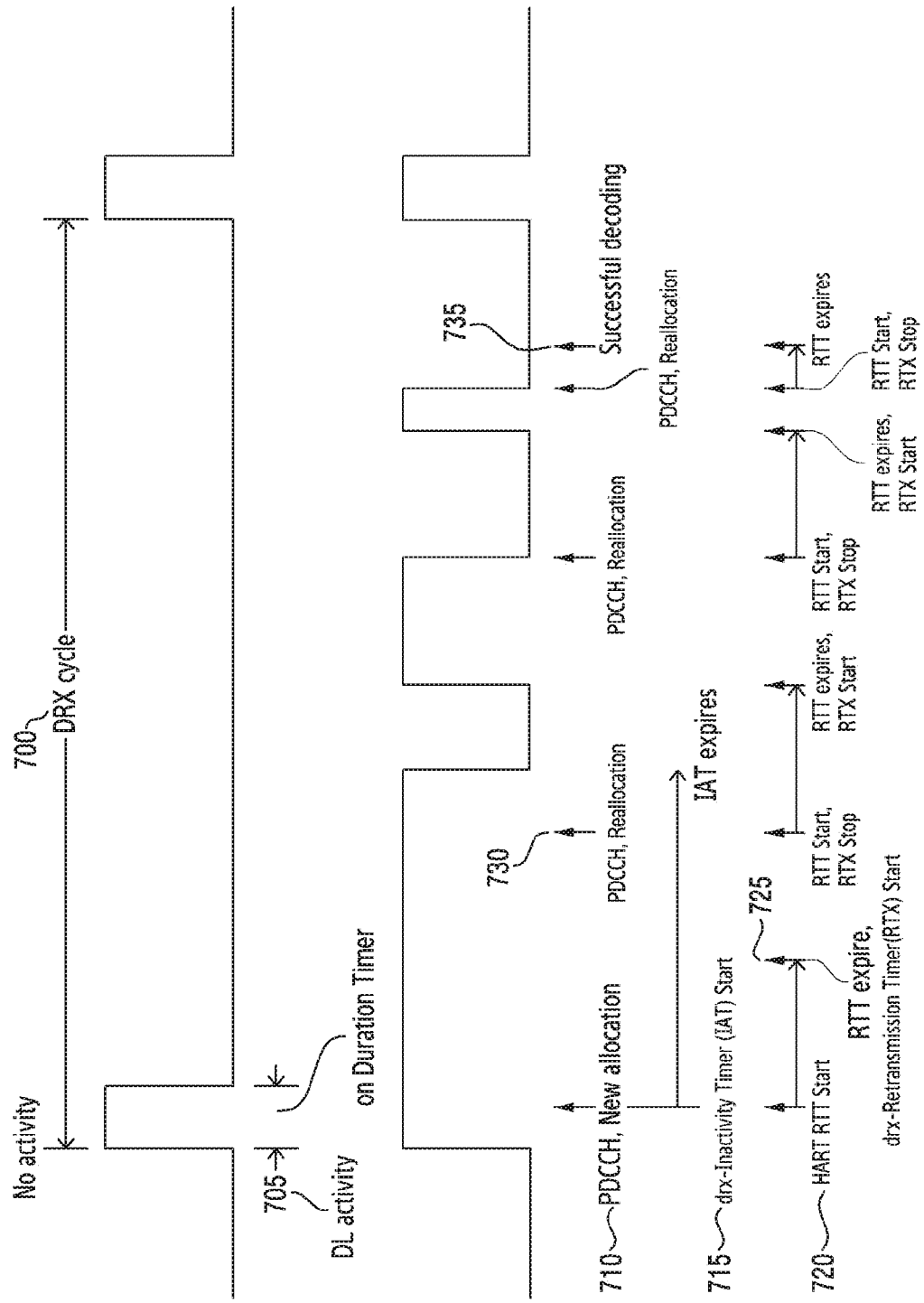
FIG. 7 illustrates a discrete reception (DRX) operation according to various embodiments of the present disclosure.

FIG. 7 illustrates a discrete reception (DRX) operation according to various embodiments of the present disclosure.

The DRX is applied to minimize power consumption of the UE, and is a technique of monitoring only in a preset PDCCH, to obtain scheduling information. The DRX may operate in both of an idle mode and a connected mode, and its operation method is slightly different.

The present disclosure relates to the connected mode. For the UE to acquire the scheduling information, continuously monitoring the PDCCH causes considerable power consumption. A basic DRX operation has a DRX cycle 700, and monitors the PDCCH only for an on-Duration 705. The DRX cycle in the connected mode is set to two values of long DRX and short DRX. The long DRX cycle is applied in a general case, and if necessary, the eNB may trigger the short DRX cycle using a MAC control element (CE). After a specific time passes, the UE changes from the short DRX cycle to the long DRX cycle. Initial scheduling information of a specific UE is provided only in the preset PDCCH. Thus, the UE may minimize the power consumption, by periodically monitoring only the PDCCH.

For the on-Duration 705, if scheduling information of a new packet is received by the PDCCH 710, the UE starts a DRX inactivity timer (IAT) 715. The UE maintains the active state during the DRX IAT. That is, the UE continues monitoring the PDCCH during the DRX IAT. In addition, the UE also starts a HARQ RTT timer 720. The HARQ RTT timer is used to prevent the UE from unnecessarily monitoring the PDCCH during a HARQ round trip time (RTT) time. The UE does not need to perform the PDCCH monitoring for a time of the HARQ RTT timer 720. Yet, while the DRX IAT and the HARQ RTT timer operate simultaneously, the UE continues the PDCCH monitoring based on the DRX IAT. If the HARQ RTT timer expires, a DRX retransmission (RTX) timer starts 725. While the DRX RTX timer operates, the UE must perform the PDCCH monitoring. In general, during the operation time of the DRX RTX timer, scheduling information for HARQ retransmission is received 730. If receiving the scheduling information for the HARQ retransmission, the UE immediately stops the DRX RTX timer, and restarts the HARQ RTT timer. The operation continues until a packet is successfully received 735.

Configuration information related to the DRX operation in the connected mode is delivered to the UE through a RRCConnectionReconfiguration message. The on-Duration timer, the DRX IAT, and the DRX RTX timer are defined with the number of PDCCH subframes. After the timer starts, if subframes defined as the PDCCH subframes pass in a set number, the timer expires. All downlink subframes belong to the PDCCH subframe in the FDD, and a downlink subframe and a special subframe correspond to it in the TDD. In TDD, a downlink subframe, an uplink subframe, and a special subframe exist in the same frequency band. Among them, the downlink subframe and the special subframe are regarded as the PDCCH subframes.

The eNB may set two states of longDRX and shortDRX. The eNB typically uses one of the two states by considering power preference indication information reported from the UE, UE mobility record information, and characteristics of the configured DRB. The two states are transited according to whether a specific timer expires or by transmitting a specific MAC CE to the UE.

Figure 8:
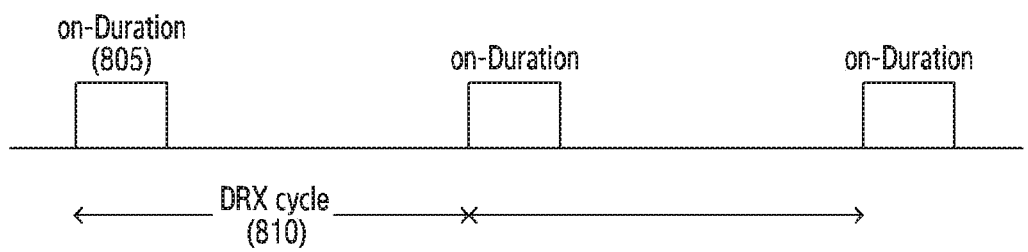
FIG. 8 illustrates a process of transmitting and receiving a wake-up signal (WUS) according to various embodiments of the present disclosure.
Figure 8:
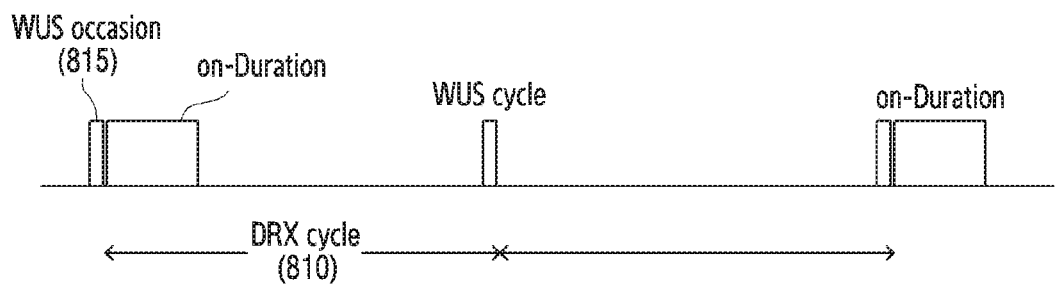

FIG. 8 illustrates a process of transmitting and receiving a wake-up signal (WUS) according to various embodiments of the present disclosure.

The DRX operation is useful to reduce the power consumption of the UE. In addition, to further reduce the power consumption of the UE, the WUS has been proposed. The key of the DRX operation is to identify whether new scheduling has occurred, only in an on-Duration 805 which arrives at a set DRX cycle 810. Thus, to identify presence or absence of the scheduling, there is no need to monitor the PDCCH in every time occasion, and the power consumption may be reduced in an occasion without monitoring. However, since the PDCCH is monitored for each on-Duration, the power of the UE is still consumed in the corresponding time occasion. To reduce the power consumption of the corresponding time occasion, the WUS 815 may be transmitted in a very short time occasion before the on-Duration arrives. The WUS 815 instructs whether the UE needs to wake up in the on-Duration and to receive a signal from the eNB. The eNB transmits the WUS in a specific short time occasion before the on-Duration, if downlink (DL) assignment for the UE, uplink (UL) grant or a paging message is transferred in the upcoming on-Duration. If the UE receives the WUS in a short time occasion, and the WUS indicates to receive the signal from the eNB, the UE needs to wake up in the upcoming on-Duration, and to receive the signal from the eNB. Otherwise, if the UE does not receive the WUS in the short time occasion, or the received WUS indicates not to receive the signal from the eNB, the UE does not need to wake up in the on-Duration. Accordingly, the UE may pre-identify whether to wake up in on-Duration, through WUS operation, and minimize the power consumed in the on-Duration.

The operations of the UE have been described based on the connected mode DRX (C-DRX) operation of the connected mode in the present disclosure, but may be applied also to a paging cycle operation of the idle mode. That is, for a specific short time occasion before a paging occasion (PO) arrives, the eNB may transmit the WUS, and the WUS may indicate whether the paging message is transmitted in the upcoming PO. The time occasion for transmitting the WUS should be shorter than the length of the on-Duration or the PO to reduce the power consumption.

Through two or more serving cells, the power consumption of the HE may be saved if applying the WUS also to carrier aggregation which provides a service to the UE. The present disclosure suggests a method in which the UE operates to receive the WUS, if the carrier aggregation is applied.

The method suggested in the present disclosure may set the WUS in a plurality of serving cells, and if any one of them is detected by the UE, the UE drives an on-Duration timer. If the time occasion for receiving the WUS is already an active time or the upcoming on-Duration is already regarded as the active time according to another condition, the UE does not perform the operation for detecting the WUS.

Figure 9:
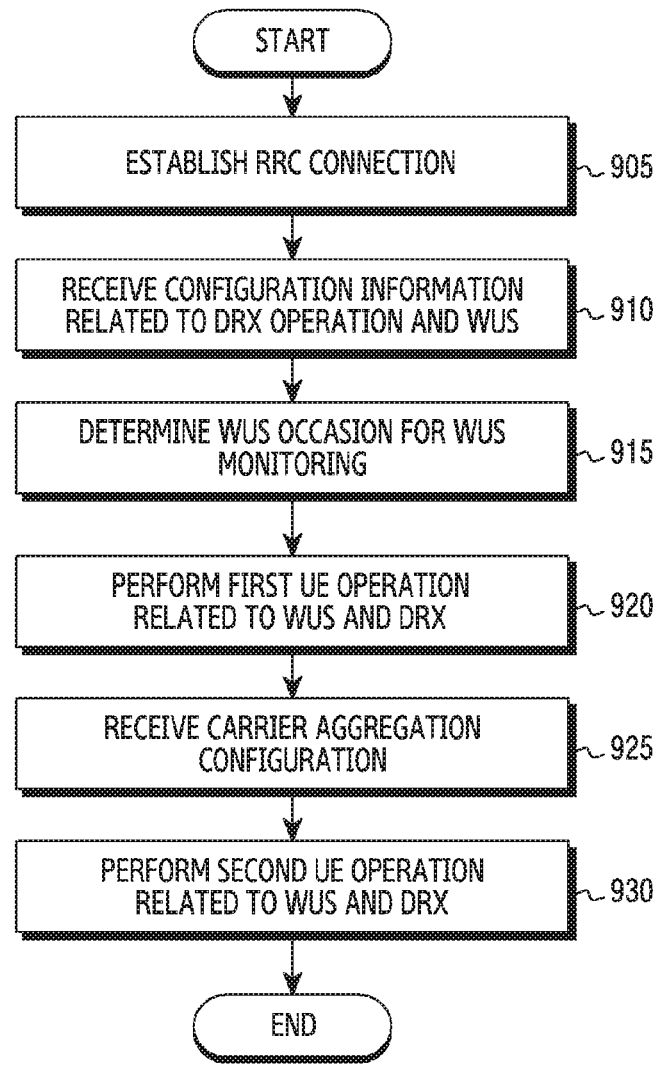
FIG. 9 is a flowchart of a process for receiving a WUS at a UE according to various embodiments of the present disclosure.
Figure 10:
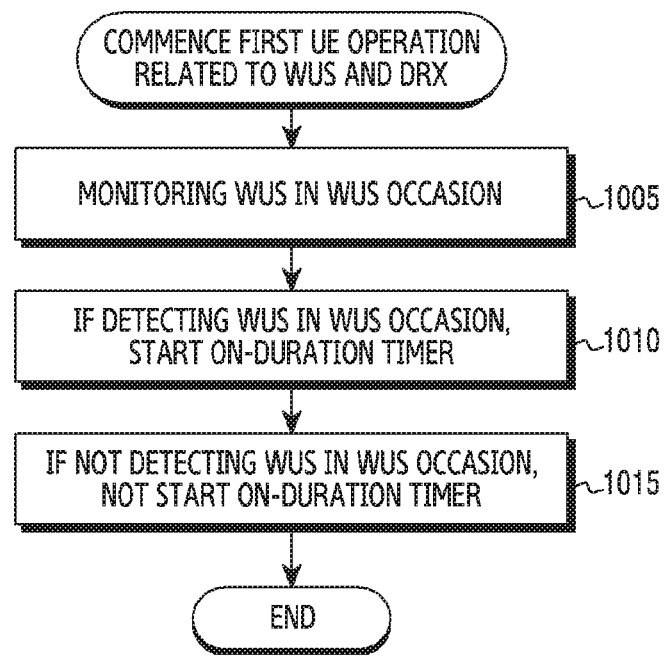
FIG. 10 is a flowchart of a process of a UE for performing a first UE operation according to various embodiments of the present disclosure.
Figure 11:
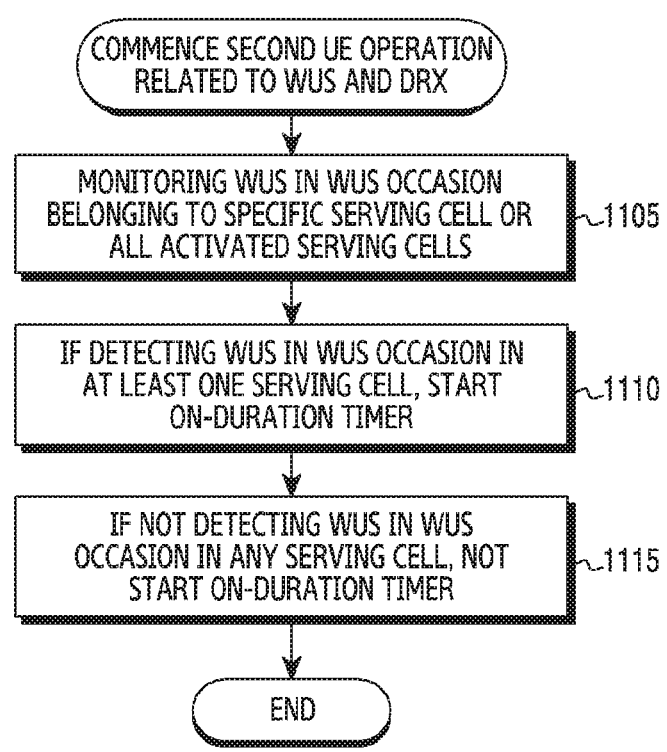
FIG. 11 is a flowchart of a process of a UE for performing a second UE operation according to various embodiments of the present disclosure.

The following FIG. 9 through FIG. 11 illustrate a process of a UE performing a DRX operation using a WUS according to various embodiments of the present disclosure.

FIG. 9 is a flowchart illustrating a process of a UE receiving a WUS according to various embodiments of the present disclosure.

In step 905, the UE establishes an RRC connection with one serving cell, that is, a primary cell (PCell).

In step 910, the UE receives configuration information related to the DRX operation and WUS reception from the eNB.

In step 915, the UE determines a WUS occasion for transmitting the WUS from the configuration information. The WUS occasion is implicitly determined using information of the DRX cycle and the on-Duration occasion in the DRX configuration information, or is explicitly indicated from the eNB. For example, a time occasion from a specific OFDMA symbol immediately before the on-Duration to a specific time point before the on-Duration may be regarded as the WUS occasion. The specific OFDMA symbol may be preset, may be determined according to an amount of information of the WUS, or may be explicitly indicated by the eNB. There may be a specific time occasion between the WUS occasion and the on-Duration. This is the time taken for the HE to detect the WUS in the WUS occasion, decode the WUS, and determine whether to maintain the active time in the on-Duration. The specific time occasion may be preset, or explicitly indicated from the eNB.

In step 920, the UE performs a first UE operation related to the DRX operation and the WUS reception operation in the PCell.

In step 925, the UE receives the configuration information related to the carrier aggregation from the eNB, and sets two or more serving cells. The eNB may set a particular serving cell to which the WUS is transmitted. As an example, the particular serving cell may be an spCell such as a PCell. Alternatively, the WUS may be transmitted in all the activated serving cells. The eNB provides DRX configuration information on a cell group basis, and all the activated serving cells belonging to one cell group controlled by a single MAC entity apply the DRX configuration information. Thus, for all the serving cells, the UE performs the same DRX operation which applies the same cycle and a related timer value.

In step 930, the UE performs a second UE operation related to the DRX operation and the WUS reception operation in a plurality of serving cells.

FIG. 10 is a flowchart illustrating a process for a UE performing a first UE operation according to various embodiments of the present disclosure.

In step 1005, the IX monitors a WUS in a WUS occasion.

In step 1010, if detecting the WUS in the WUS occasion, the UE switches to the active time in an upcoming on-Duration after the WUS occasion, and drives the on-Duration timer, that is, the on-Duration starts, according to the following equations.

If the WUS is detected in the WUS occasion (instruct to switch to the active time in the on-Duration in which the WUS arrives), and a Short DRX cycle is set, $$[(SFN \times 10) + \text{subframe number}] \bmod (drx\text{-Short-Cycle}) = (drx\text{-StartOffset}) \bmod (drx\text{-Short-Cycle}) \text{ or}$$

if the WUS is detected in the WUS occasion (instruct to switch to the active time in the on-Duration in which the WUS arrives), and a long DRX cycle is set, $$[(SFN \times 10) + \text{subframe number}] \bmod (drx\text{-Long-Cycle}) = drx\text{-StartOffset}$$

the On-Duration starts at a subframe location satisfying the equation. However, if the eNB sets the drx-SlotOffset, the on-Duration starts after the drx-SlotOffset value passes from a start time of the derived subframe. The unit of drx-SlotOffset is a slot.

In step 1015, if the WUS is not detected in the WUS occasion, the UE does not switch to the active time in the upcoming on-Duration after the WUS occasion.

FIG. 11 is a flowchart illustrating a process of a UE performing a second UE operation according to various embodiments of the present disclosure.

In step 1105, the UE monitors a WUS in a WUS occasion in a specific serving cell or all activated serving cells. If the eNB was configured to transmit the WUS only in a specific serving cell such as a PCell, it monitors the WUS in the WUS occasion occasion only in the serving cell. Otherwise, if the eNB was configured to transmit the WUS in all the activated serving cells, it monitors the WUS in the same WUS occasion occasion in all the activated serving cells.

In step 1110, if the WUS is detected in at least one WUS occasion in the specific serving cell or all the activated serving cells, all the serving cells are switched to the active time in the on-Duration coming after the WUS occasion, and drive the on-Duration timer.

If the WUS is detected in the WUS occasion (instruct to switch to the active time in the on-Duration where the WUS arrives), and a Short DRX cycle is set,

[($SFN$×10)+subframe number]modulo($drx$-Short-Cycle)=($drx$-StartOffset)modulo ($drx$-Short-Cycle) or if the WUS is detected in the WUS occasion (instruct to switch to the active time in the on-Duration where the WUS arrives), and a long DRX cycle is set,

[($SFN$×10)+subframe number]modulo($drx$-Long-Cycle)=$drx$-StartOffset the on-Duration starts for all the activated serving cells at a subframe location satisfying the expression thereof. Yet, if the eNB sets drx-SlotOffset, the on-Duration starts for all the activated serving cells after the drx-SlotOffset value passes from the start time of the derived subframe. The unit of drx-SlotOffset is a slot.

In step 1115, if the WUS is not detected in any WUS occasion in the specific serving cell or all the activated serving cells, all the serving cells do not switch to the active time in on-Duration coming after the WUS occasion.

The following FIG. 12 through FIG. 15 illustrate a process of a UE performing a DRX operation using a WUS according to various embodiments of the present disclosure.

Figure 12:
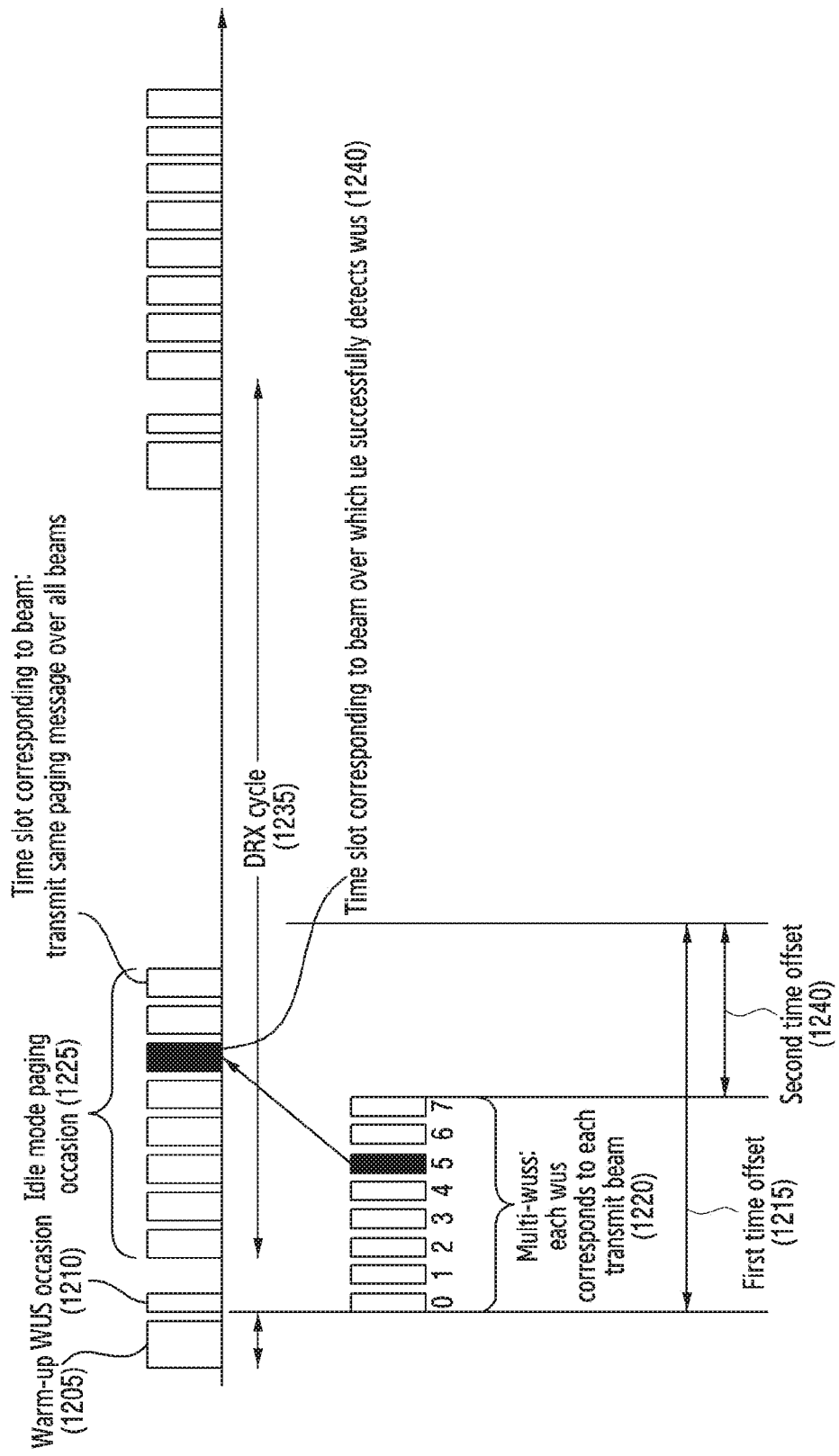
FIG. 12 illustrates a process of a UE for transmitting and receiving a WUS signal in an idle mode according to various embodiments of the present disclosure.

FIG. 12 illustrates a process of a UE transmitting and receiving a WUS signal in an idle mode according to various embodiments of the present disclosure.

The idle mode UE has a warm-up time 1205 required to drive an RF, a modem, and so on, before a WUS occasion 1210 arrives. The warm-up time varies per UE depending on the implementation. The WUS occasion which is the time occasion where the WUS is transmitted is positioned before a PO arrives. A start time point of the WUS occasion is explicitly indicated to the UE through system information 1215, or implicitly determined to a specific time point before the PO. As an example, the specific time point may be a start time of a synchronization sequences (SS) burst closest to the PO, or a time point before a time combining one beam sweeping cycle before the PO and a specific time occasion 1240. The specific time occasion 1240 is necessary for the UE to decode the WUS, and to determine whether to monitor the paging message in the upcoming PO. The specific time occasion has a value greater than or equal to zero and the eNB explicitly indicates using system information or a preset value is applied. Monitoring the paging message means monitoring downlink control information (DCI) indicating the paging message, and receiving a corresponding paging message.

In the WUS occasion, if determining that a particular UE needs to monitor the paging message in the upcoming PO, the eNB transmits one WUS for each of its transmit beam. The WUS is identical regardless of the beam. The eNB may recognize which transmit beam the idle mode UEs may optimally receive. Hence, the WUS is transmitted, for all the transmit beams. As an example, if the eNB has eight transmit beams, eight WUSs 1220 in total are transmitted, using each transmit beam. UEs located in a service area of the eNB detect the WUS from at least one transmit beam. In addition, they may recognize which beam successfully detects the WUS. The SSB corresponds to one beam, and one SS burst is configured by including a plurality of SSBs corresponding to the beams respectively. If the SSB and the WUS are combined and transmitted in the TDM or FDM scheme, the UE monitors only a time occasion transmitting the SSB, for various purposes including the WUS monitoring, and thus is advantageous in optimizing the power consumption. However, the SS burst may not exist within a certain time occasion before the PO arrives, and combining the WUS to the SS burst far from the PO in a time division multiplexing (TDM) or frequency division multiplexing (FDM) form may dilute the purpose of the WUS. As an example, if the WUS is combined to the SS burst too far from the PO in the form of TDM or FDM, it does not reflect the paging occurring between the SS burst and the PO. Thus, if the PO and the SS burst before the PO arrives are apart over a specific time occasion, a WUS occasion for transmitting the WUS for each transmit beam exists, regardless of the SS burst. Otherwise, if the PO and the SS burst before the PO arrives are apart within a specific time occasion, the WUS is transmitted with the SSB. The specific time period is explicitly indicated to the UE by the eNB through the system information, or is implicitly determined to a specific time point before the PO.

A paging message for a specific UE in the NR will be transmitted in a paging occasion 1225 which is a specific time occasion belonging to a specific paging frame (PF). The PO includes a plurality of time slots, and each time slot 1230 corresponds to one transmit beam of the eNB. Accordingly, the number of the time slots is equal to the number of the transmit beams of the eNB. The eNB transmits a paging message in the corresponding transmit beam, during the time slot. All the paging messages transmitted for each time slot are identical. The eNB does not know a location of the specific UE in the idle mode, and may not designate the most appropriate transmit beam for the UE. Thus, the eNB needs to transmit the same paging message over all the transmit beams. Sequentially transmitting the signals over all the transmit beams as above is referred to as beam sweeping. Hence, as the number of the transmit beams increases, a beam sweeping cycle or the length of the PO increases proportionally. In general, the UE also monitors the paging in all the transmit beams during the PO occasion. The UE succeeds in decoding the paging received from at least one transmit beam.

Idle mode UEs located in the service area of the eNB first detect a WUS from at least one transmit beam. In so doing, the UE may also recognize which beam successfully detects the WUS. Hence, there is no need to monitor the paging in every transmit beam during the PO occasion as in no WUS operation. That is, since it is highly likely to successfully decode the paging in the beam successfully detecting the WUS, the UE monitors the paging only in a time slot 1240 of the PO corresponding to the beam. It may successfully decode the WUS from a plurality of beams in the WUS occasion occasion. In some cases, the UE may select one beam which provides the greatest signal strength, or may randomly select one. The UE monitors the paging provided from the same beam in the time slot within the PO corresponding to the selected beam.

Figure 13:
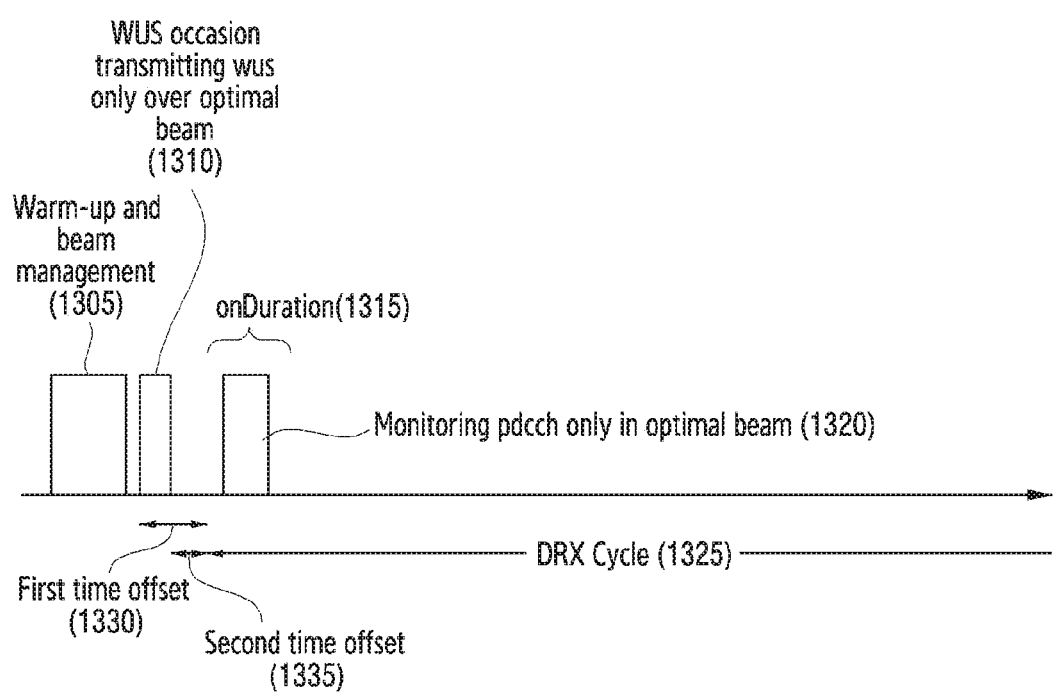
FIG. 13 illustrates a process of a UE for transmitting and receiving a WUS signal in a connected mode according to various embodiments of the present disclosure.

FIG. 13 illustrates a process of a UE transmitting and receiving a WUS signal in a connected mode according to various embodiments of the present disclosure.

The connected mode UE has a warm-up time and beam management operation time 1305 required to drive an RF, a modem, and so on before a WUS occasion arrives. The beam management operation is performed to maintain an optimal beam before an on-Duration in the connected mode. The beam management operation largely includes two steps. The first step measures the signal strength of beams, and the second step, if required to adjust a transmit beam paring with the eNB, reports and updates it to the eNB. Accordingly, the connected mode UE and the eNB regard that the optimal beam is maintained, after the beam management operation. The eNB, which recognizes which beam is optimal, for a particular UE in the connected mode, merely transmit the WUS or paging in the optimal optimal beam, without having to transmit the WUS or the paging, through the beam sweeping operation, as in idle mode operation.

The WUS occasion which is the time occasion transmitting the WUS 1310 is located before an on-Duration 1315 arrives. A time point starting the WUS occasion is explicitly indicated to the UE through system information or dedicated RRC signaling 1330 or is implicitly determined to a specific time point before the on-Duration. As an example, the specific time point may be a start time point of the SS burst closest to the on-Duration, or a time point before a time combining one beam sweeping cycle and a specific time occasion 1335 before the on-Duration. The specific time occasion 1335 is necessary for the UE to decode the WUS and to determine whether to monitor PDCCH in the upcoming on-Duration. The specific time occasion has a value of 0 or more and the eNB explicitly indicates using the system information or the dedicated RRC signaling, or a preset value is applied. Monitoring the PDCCH means that the UE identifies whether DL allocation or UL grant, that is, scheduling information for itself is provided from the eNB.

In the WUS occasion, if determining that the specific UE needs to monitor the PDCCH in the upcoming on-Duration, the eNB transmits one WUS in the optimal beam maintained or updated, through the beam management operation. If the WUS is transmitted by combining the SSB and the WUS in the TDM or FDM scheme, the UE, which needs to monitor only the time occasion transmitting the SSB, for various purposes including the WUS monitoring, is advantageous in optimizing the power consumption. However, the SS burst may not exist within a certain time occasion before the on-Duration arrives, and combining the WUS to the SS burst too far from the on-Duration in the TDM or FDM form may dilute the purpose of the WUS. As an example, if the WUS is combined to the SS burst too far from the on-Duration in the TDM or FDM form, it does not reflect the paging occurring between the SS burst and the on-Duration. Thus, if the on-Duration and the SS burst before the on-Duration arrives are apart over a specific time occasion, a WUS occasion for transmitting the WUS over the optimal transmit beam exists, regardless of the SS burst. Otherwise, if the on-Duration and the SS burst before the on-Duration arrives are apart within a specific time occasion, the WUS is transmitted with the SSB. The specific time occasion is explicitly indicated to the UE by the eNB through the system information, or is implicitly determined to a specific time point before the on-Duration.

The eNB may instruct the connected mode UE to configure CSI-RS besides the SSB, and to perform cell measurement based on the CSI-RS. If the WUS is transmitted by combining the CSI-RS and the WUS using the TDM or FDM scheme, the UE, which needs to monitor only a time occasion transmitting the CSI-RS, for various purposes including the WUS monitoring, is advantageous in optimizing the the power consumption. However, the CSI-RS may not exist within a specific time occasion before the on-Duration arrives, and combining the WUS to the CSI-RS too far from the on-Duration in the TDM or FDM form may dilute the purpose of the WUS. As an example, if the WUS is combined to the CSI-RS too far from the on-Duration in the TDM or FDM form, it does not reflect scheduling occurring between the CSI-RS and the on-Duration. Thus, if the on-Duration and the CSI-RS before the on-Duration arrives are apart over a specific time occasion, a WUS occasion transmitting the WUS over the optimal beam exists, regardless of the CSI-RS. Otherwise, if the on-Duration and the CSI-RS before the on-Duration arrives are apart within the specific time occasion, the WUS is transmitted together with the CSI-RS. The specific time period is explicitly indicated to the UE by the eNB through the system information, or is implicitly determined to a specific time point before the on-Duration.

As described earlier, the WUS may be transmitted together with the SSB or the CSI-RS. The eNB explicitly indicates to the UE which one of the SSB and the CSI-RS is transmitted with the WUS, or sets to use both of them, wherein it transmits the WUS, by combining with either the SSB or the CSI-RS, depending on whether a specific condition is satisfied. For example, either the SSB or the CSI-RS existing within a specific time occasion with the upcoming on-Duration is combined and transmitted with the WUS using the TDM or FDM. If both of the SSB and the CSI-RS exist within a specific certain time occasion, a preset or set one is transmitted with the WUS.

The connected mode UEs located in the service area of the eNB first detect the WUS from the optimal beam. The UE, which recognizes the optimal beam, does not need to monitor the PDCCH in every transmit beam during the on-Duration. That is, since the WUS may also successfully decode the PDCCH in the optimal beam, it monitors the PDCCH only in a time slot 1320 in the on-Duration corresponding to the beam.

Figure 14:
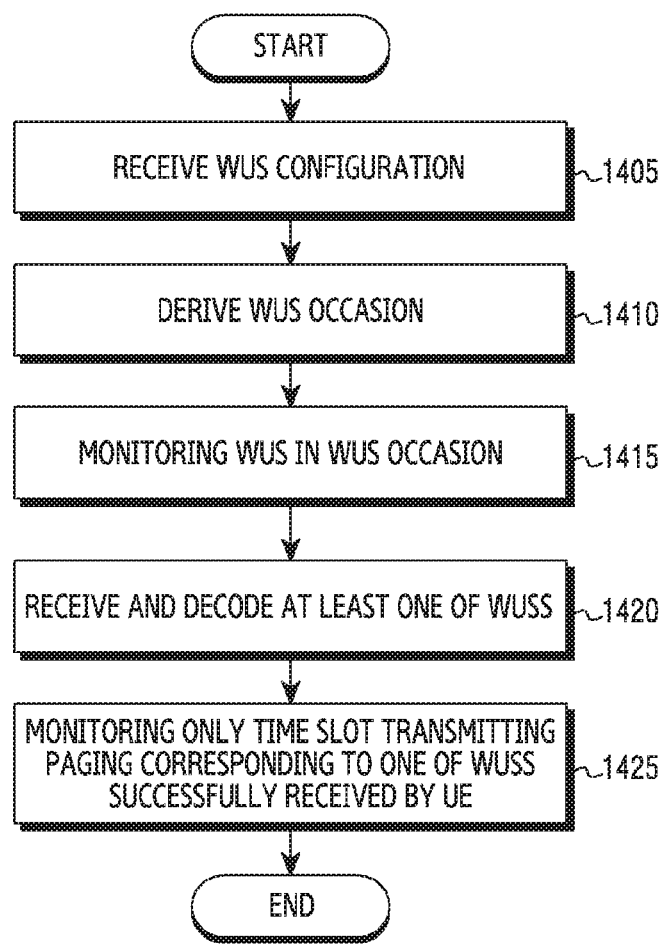
FIG. 14 is a flowchart of a process of a UE for receiving a WUS signal in an idle mode according to various embodiments of the present disclosure.

FIG. 14 is a flowchart of a process of a UE for receiving a WUS signal in an idle mode according to various embodiments of the present disclosure.

In step 1405, the UE supporting the WUS receives configuration information required for receiving a WUS from the eNB through system information.

In step 1410, the UE derives an occasion transmitting the WUS. The WUS occasion is located between a warm-up occasion required to turn on and prepare a RF or a communication modem and the upcoming PO occasion. The WUS occasion may match a position of a SS burst, if satisfying a specific condition. The length of the WUS occasion matches a beam sweeping occasion in which all transmit beams of the eNB transmitting the WUS may transmit.

In step 1415, the UE monitors the WUS at the derived WUS occasion position.

In step 1420, the UE receives and decodes at least one of WUSs transmitted over the transmit beams respectively.

In step 1425, the UE monitors a paging message in the eNB transmit beam transmitting the WUS successfully decoded. If the WUS succeeds in a plurality of beams, the UE monitors the paging message in a beam which provides the greatest signal strength or in a randomly selected beam among the plurality of the related beams. Alternatively, the UE may decode the paging message by soft combining paging messages received from corresponding beams.

Figure 15:
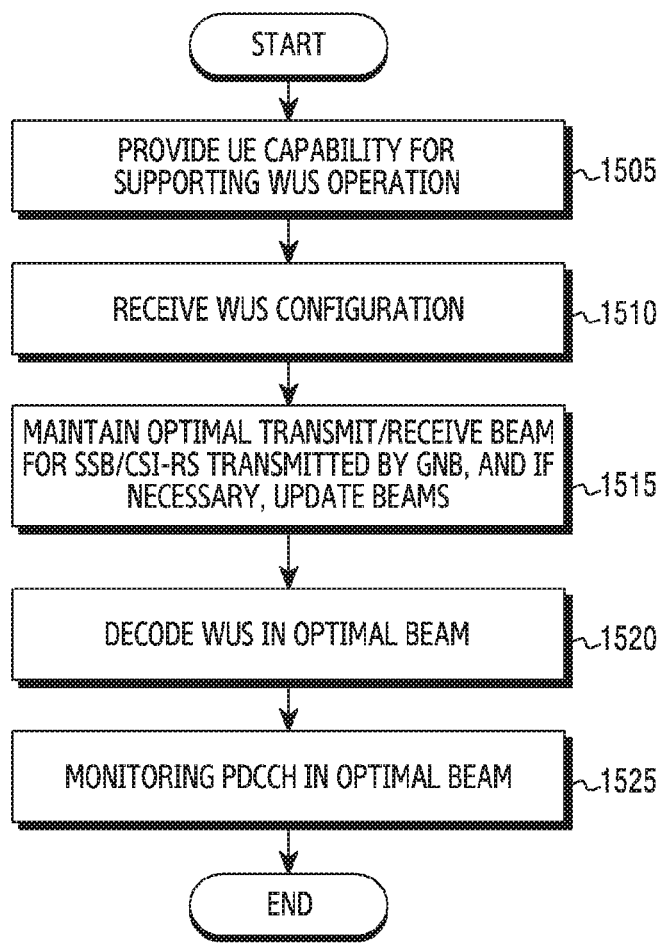
FIG. 15 is a flowchart of a process of a UE for receiving a WUS signal in a connected mode according to various embodiments of the present disclosure.

FIG. 15 is a flowchart of a process of a UE for receiving a WUS signal in a connected mode according to various embodiments of the present disclosure.

In step 1505, the UE reports to a serving eNB that it supports the WUS operation.

In step 1510, the UE is provided with configuration information required for receiving a WUS from the eNB.

In step 1515, the UE maintains an optimal transmit/receive beam by performing the beam management operation between a warm-up occasion and a WUS occasion. If it is necessary to update old optimal beams, it reports to the eNB to update with a new optimal transmit beam.

In step 1520, the UE receives and decodes the WUS in the optimal beam. If the WUS is not transmitted in the WUS occasion, or if the WUS indicates no PDCCH monitoring required, there no need to perform the PDCCH monitoring in the upcoming on-Duration.

In step 1525, the UE monitors the PDCCH in the optimal beam.

The NR may send a UE having no data transmission and reception for a specific time to the RRC inactive mode/state, rather than the RRC idle mode. The UE of the RRC inactive mode/state may have two types of the paging area, that is, a RAN notification area (RNA) and a core network tracking area (CN TA). In general, the CN TA may include one or a plurality of RNAs. If the UE changes the RNA, an RNA update operation of the radio layer, that is, an access stratum (AS) level is performed, and if the CN TA is changed, a CN TA update operation of the core layer, that is, a non-access stratum (NAS) level is performed. However, the RNA and CN TA update operations are independently triggered if the RNA is present at a boundary of the CN TA at the same time, and in this case, the network may unnecessarily change the state of the UE. Hereinafter, according to embodiments of FIGS. 16 through 22, a method for effectively setting a paging area of the RRC inactive mode/state UE, and effectively managing mobility of the RRC inactive mode/state UE by transmitting and processing a paging message to the UE in the NR is provided.

Figure 16:
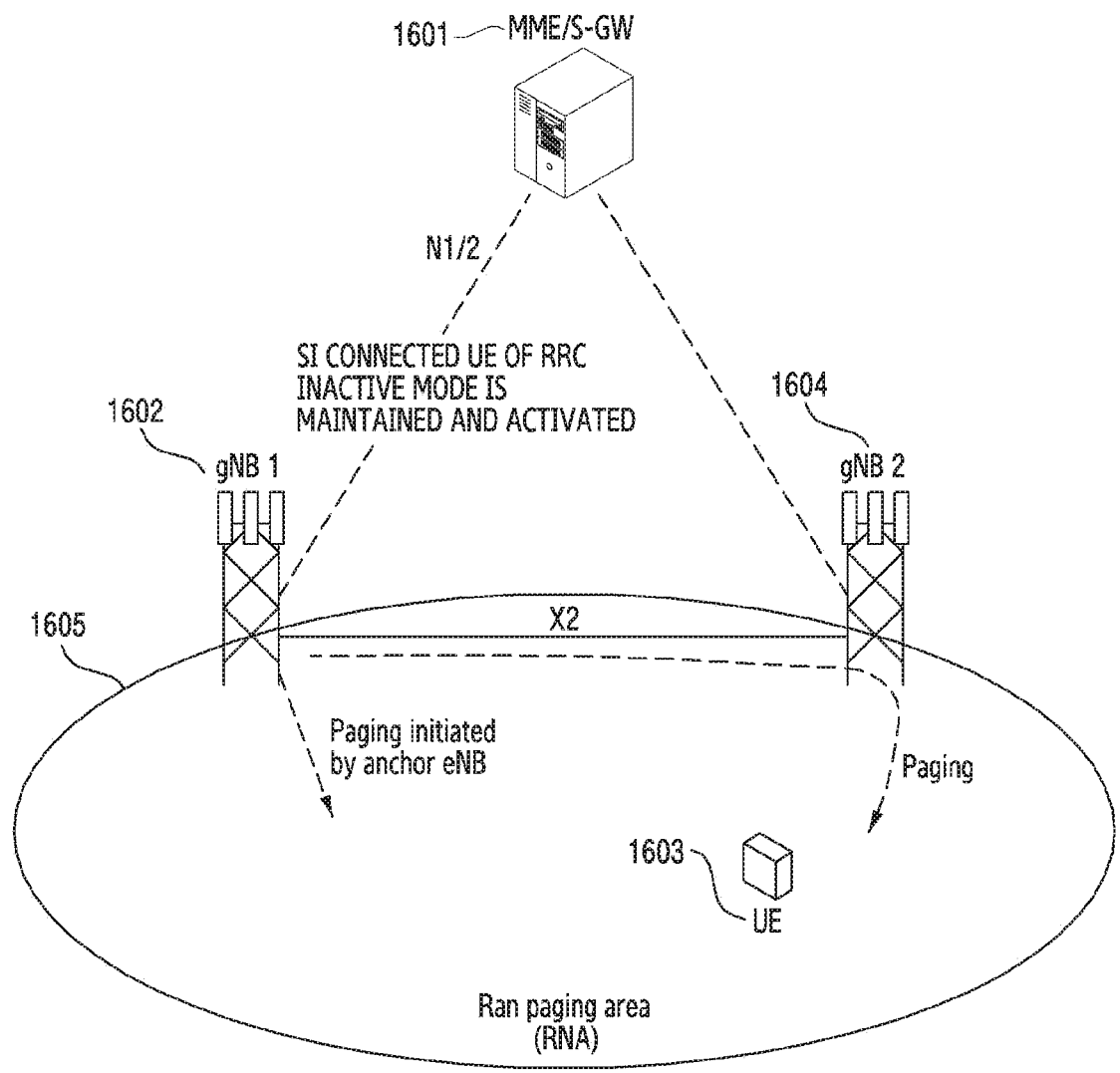
FIG. 16 illustrates an RRC inactive mode/state or an RRC lightly connected mode according to various embodiments of the present disclosure.

FIG. 16 illustrates an RRC inactive mode/state or an RRC lightly connected mode according to various embodiments of the present disclosure.

The RRC inactive mode/state is a newly defined UE mode in addition to the idle mode or the connected mode to reduce signaling overhead due to handover and paging transmission operations. FIG. 16 assumes a situation in which an NR gNB is connected to an LTE core network. The procedure of FIG. 16 may also be applied if an NR core network is applied, wherein a specific name or a detailed operation may differ.

The newly defined UE mode may be set to other named mode than the RRC inactive mode/state or the RRC lightly connected mode. Hereinafter, the newly defined UE mode is referred to as the RRC inactive mode/state.

A UE 1603 in the RRC inactive mode/state stores UE context of the UE and maintains an S1 connection, and paging is triggered by an anchor gNB 1602 and 1604, or an MME. The anchor gNB 1602 and 1604 is an gNB storing the context of the UE, and may manage mobility of the UE. Accordingly, if there is data to transmit to the UE, the MME 1601, which recognizes the UE in the connected mode, immediately transmits the data to the eNB, rather than triggering the paging first. The gNB receiving the data forwards the paging to all the gNBs in a specific radio paging area, that is, an RNA 1605, and all the gNBs transmit the paging.

Figure 17:
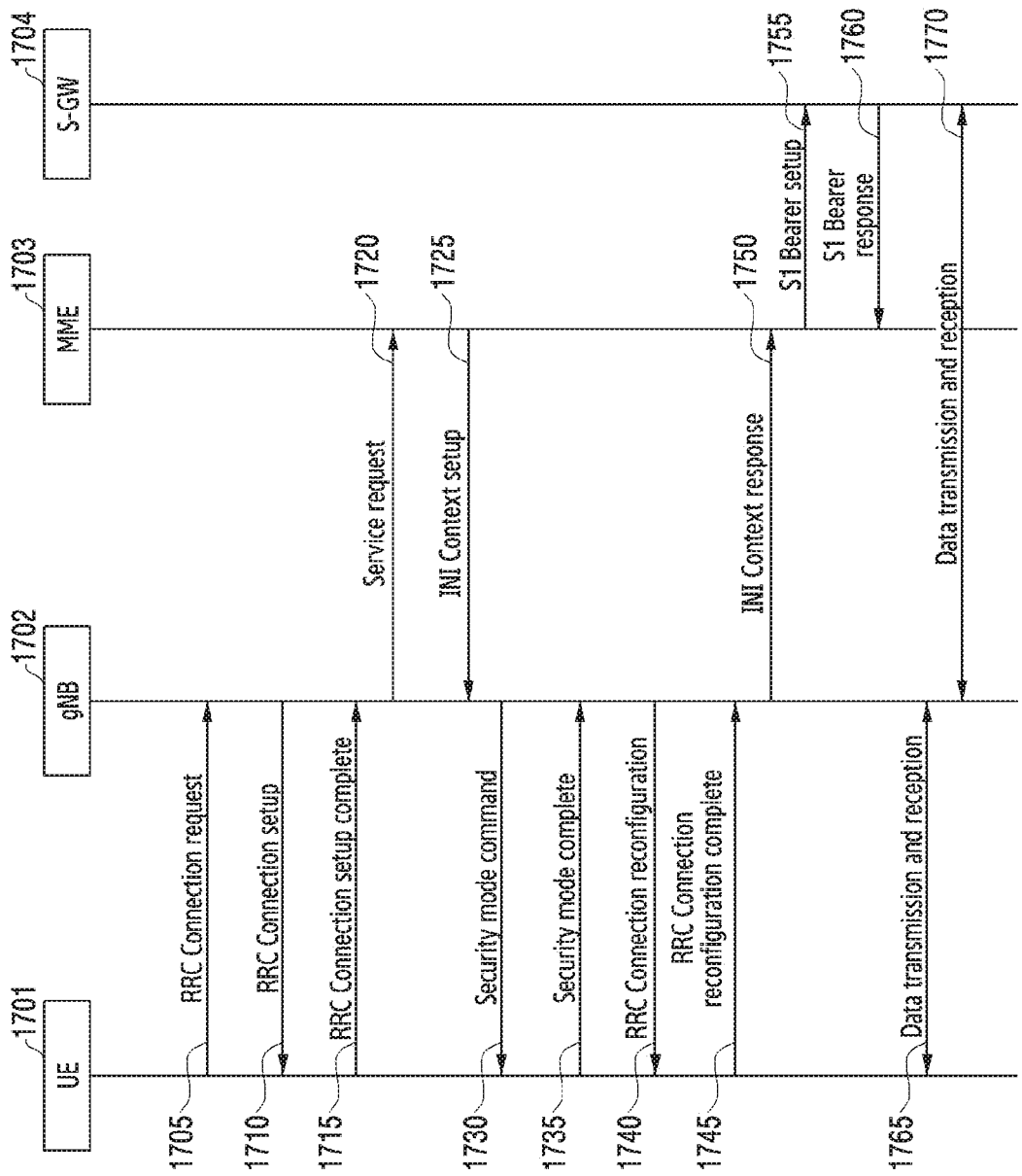
FIG. 17 illustrates an example of a process of establishing a connection with a network for a UE to transmit and receive data in a wireless communication system according to various embodiments of the present disclosure.

FIG. 17 illustrates an example of a process of establishing a connection with a network for a UE to transmit and receive data in a wireless communication system according to various embodiments of the present disclosure.

A UE which is not currently connected, that is, an idle mode UE 1701 performs an RRC connection establishment process with a gNB if data to transmit occurs. The UE 1701 establishes backward transmission synchronization with an eNB 1702 through a random access process and transmits a RRCConnectionRequest message to the gNB 1705. The RRCConnectionRequest message includes an identifier of the UE 1701 and establishmentCause for establishing the connection. The gNB 1702 transmits an RRCConnectionSetup message so that the UE 1701 establishes the RRC connection 1710. The RRCConnectionSetup message includes RRC connection configuration information. The RRCConnectionSetup message is also called a signaling radio bearer (SRB), and is used for transmitting and receiving an RRC message which is a control message between the UE 1701 and the gNB 1702. The UE 1701 establishing the RRC connection transmits a RRCConnectionSetupComplete message to the gNB 1702 1715. The RRCConnectionSetupComplete message includes a control message SERVICE REQUEST for the UE 1701 to request bearer setup for a specific service from an MME 1703. The gNB 1702 transmits the SERVICE REQUEST message contained in the RRCConnectionSetupComplete message to the MME 1720, and the MME 1703 determines whether to provide the service requested by the UE 1701. If determining to provide the service requested by the UE 1701 according to a determination result, the MME 1703 transmits an INITIAL CONTEXT SETUP REQUEST message to the gNB 1702 1725. The INITIAL CONTEXT SETUP REQUEST message includes quality of service (QoS) information to apply in setting a data radio bearer (DRB), and security related information to apply to the DRB, for example, security key or security algorithm information. The gNB 1702 exchanges a SecurityModeCommand message 1730 and a SecurityModeComplete message 1735 with the UE 1701 to set the security. If the security setup is completed, the eNB 1702 transmits an RRCConnectionReconfiguration message to the UE 1701 1740. The RRCConnectionReconfiguration message includes DRB setup information for processing user data, and the UE 1701 sets the DRB by applying the information and transmits the RRCConnectionReconfigurationComplete message to the gNB 1702 1745. The gNB 1702 completing the DRB setup with the UE 1701 transmits an INITIAL CONTEXT SETUP COMPLETE message to the MME 1703 1750, and the MME 1703 receiving the INITIAL CONTEXT SETUP COMPLETE message exchanges an S1 BEARER SETUP message 1755 and an S1 BEARER SETUP RESPONSE message 1760 with an S-GW 1704 to set an S1 bearer. The S1 bearer is a connection for data transmission configured between the S-GW and the gNB and corresponds to the DRB in one-to-one. After all of the above processes are completed, the UE 1701 transmits and receives data 1765 and 1770 through the gNB 1702 and the S-WG 1704. As such, the example of the data transmission and reception process largely includes three steps of the RRC connection configuration, the security configuration, and the DRB configuration.

Figure 18:
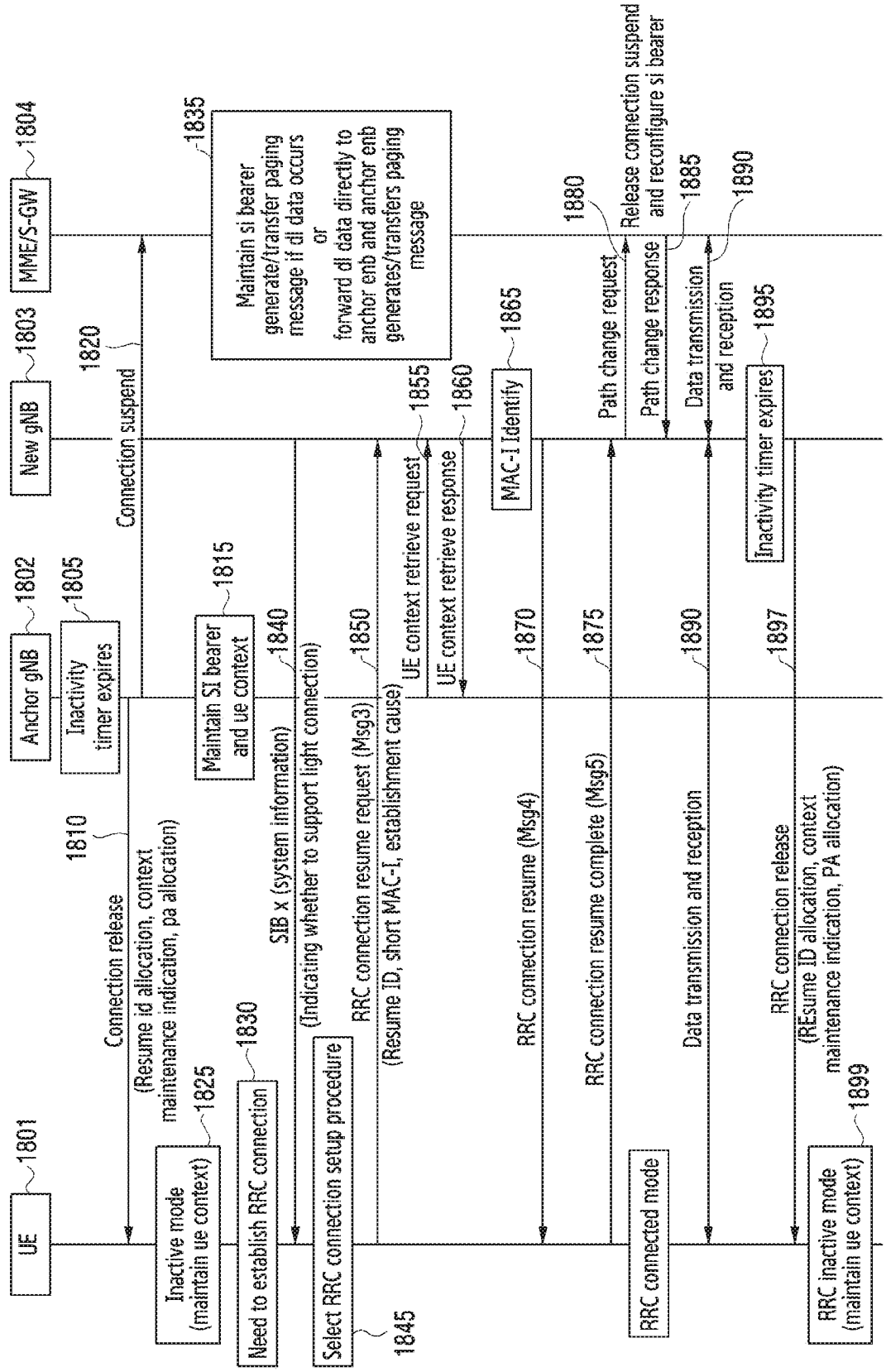
FIG. 18 is a signal flow diagram between a UE and a gNB for supporting an RRC inactive mode/state in a wireless communication system according to various embodiments of the present disclosure.

FIG. 18 is a signal flow diagram between a UE and a gNB for supporting an RRC inactive mode/state in a wireless communication system according to various embodiments of the present disclosure.

In detail, FIG. 18 illustrates a signaling procedure of a UE 1801 and a gNB 1803 for supporting the RRC inactive mode/state in the NR, and illustrates the procedure of setting a paging area of the RRC inactive mode/state UE 1801. FIG. 18 assumes a situation where an NR gNB is connected to an LTE core network. The procedure of FIG. 18 may also be applied to the NR core network, wherein a specific name or a detailed operation may differ.

FIG. 18 illustrates signal flows of the UE 1801, an anchor gNB 1802, a new gNB 1803, and an MME 1804 for performing a procedure of reusing context and an S1 bearer. The UE 1801 of the RRC connected mode/state performs data transmission and reception with the gNB 1802. If the data transmission and reception stops, the gNB 1802 may drive a specific timer and the gNB considers releasing the RRC connection of the UE if the data transmission and reception does not resume until the timer expires 1805. The gNB 1802 may release the RRC connection of the UE 1801 according to a specific rule and then store UE context and allocate a resume ID (UE context identifier) while transmitting a control message instructing the UE 1801 to release the RRC connection and transmit paging area (PA) or RNA or RAN paging area or CN based paging area configuration information for the UE to report mobility in the RRC inactive mode/state. In this case, the UE 1801 may need to store the UE context based on the resume ID assignment, or the gNB 1802 may transmit a separate context maintenance indication for instructing the UE 1801 to operate in the RRC inactive mode/state and to store the UE context through the RRC message 1810. In addition, the RRC message may include period information for the gNB to maintain the context or a cell list for applying a procedure of using the stored context if the UE is to reconfigure the RRC connection within an effective period of time. The paging area configuration information may include paging area identity or RAN area ID or CN based paging area IDs or a list of cell IDs, and may include an addition/subtraction indication per cell ID. The addition/subtraction indication may be a 1-bit indication, the cell ID may be added to the paging area if instructing the addition for a specific cell ID, and the cell ID may be subtracted from the paging area if instructing the subtraction for a specific cell ID. The RRC message 1810 may use a RRCConnectionRelease message, or may switch the UE 1801 to the RRC inactive mode/state by including configuration information using a newly defined RRC message. After releasing the RRC connection of the UE 1801, the gNB 1802 maintains the UE context and the S1 bearer of the UE 1801 1815. The S1 bearer indicates an S1-control bearer used to exchange a control message between the gNB 1802 and the MME 1804, and an S1-user plane bearer used to exchange user data between the gNB 1802 and the S-GW 1804. By maintaining the S1 bearer, it is possible to omit the procedure for the S1 bearer configuration if the UE 1801 wants to configure the RRC connection in the same cell or in the same gNB 1802. If the effective period of time expires, the gNB 1802 may delete the UE context and release the S1 bearer. The UE 1801 receiving the RRCConnectionRelease message of step 1801 switches to the RRC inactive mode/state.

The gNB 1802 transmits a control message requesting connection suspend to the MME 1804 1820. The MME 1804 receiving the control message may instruct the S-SW 1804 to request the to initiate a paging procedure if downlink data for the UE occurs rather than forwarding the downlink data to the gNB, and the S-GW 1804 may operate accordingly 1835, or the S-GW 1804 may, if the downlink data for the UE 1801 occurs, directly forward the downlink data to the anchor gNB so that the anchor gNB 1802 generates and transmits a paging message to a neighbor gNB 1835. That is, the anchor gNB 1802 receiving the downlink data stores the data in a buffer and proceeds with the paging procedure. The anchor gNB 1802 refers to the gNB 1802 which maintains the UE context of the UE 1801 and the S1-U bearer.

The UE receiving the RRCConnectionRelease message 1810 which includes the context maintenance indication information and the resume ID may release the RRC connection, drive a timer corresponding to the valid period, record an effective cell list in a memory, maintain the current UE context in the memory without deleting it 1825, and switch to the RRC inactive mode/state. The above UE context indicates various information related to the RRC configuration of the UE, and includes SRB configuration information, DRB configuration information, security key information, and the like. Next, there occurs a need to configure an RRC connection for an arbitrary cause 1830. The UE 1801 not allocated the resume ID in the previous RRC connection release process or not instructed with the context maintenance operates according to the example the RRC connection establishment process described in FIG. 17, but the UE 1801 allocated the resume ID in the previous RRC connection release process or instructed to switch to the RRC inactive mode/state may attempt an RRC connection resume process using the stored UE context. The RRC inactive mode/state UE 1801 may perform the operation according to the example of the RRC connection establishment process of FIG. 17 according to whether the network supports the RRC inactive mode/state (or the light connection), or may perform the RRC connection resume process using the stored UE context. In the present disclosure, each gNB or cell may include and transmit an indication regarding whether each gNB or cell supports the RRC inactive mode/state (or the light connection) to system information. The indication may be included in the system information. The gNB's supporting the RRC inactive mode/state (or the light connection) may mean that the following operations 1850, 1855, 1860, 1865, 1870, 1875, 1880, 1885, and 1890 may be set and supported by the corresponding gNB or the corresponding cell. If needing to establish the RRC connection, the RRC inactive mode/state UE 1801 reads the system information of the cell on currently camp-on. If the system information does not include the indication that the gNB or the cell supports the RRC inactive mode/state (or the light connection), the UE may perform the operation according to the example of the RRC connection establishment process of FIG. 17. However, if the system information includes the indication that the gNB or the cell supports the RRC inactive mode/state (or the light connection), the UE 1801 may perform the RRC connection resume process using the stored UE context 1845. The RRC connection resume process using the stored UE context is as follows.

First, the UE 1801 transmits a preamble in a first message to perform a random access procedure. If resource allocation is feasible according to the preamble received in the first message, the gNB 1802 allocates a corresponding uplink resource to the UE 1801 using a second message. The UE 1801 transmits a ResumeRequest message including the resume ID received in step 1810 based on received uplink resource information 1850. The message may be a modified message of the RRCConnectionRequest message or a newly defined message, for example, a RRCConnectionResumeRequest message. If the UE 1801 in the RRC inactive mode/state releases the connection from the existing anchor gNB 1802 and moves and camps on a cell of other gNB, the new gNB 1803 may obtain which gNB provided the service to the corresponding UE 1801 by receiving and identifying the resume ID of the UE thus. If successfully receiving and identifying the resume ID, the new gNB 1803 performs a context retrieve procedure 1855 and 1860 from the existing gNB 1802. The new gNB 1830 may retrieve the UE context from the existing gNB 1802 through an S1 or X2 interface.

If the new gNB 1803 receives the resume ID but fails to successively distinguish the UE 1801 for some cause, it may transmit a RRCConnectionSetup message to the UE and return to the operation procedure according to the example of the RRC connection establishment process of FIG. 17. That is, if the RRCConnectionSetup message is transmitted to the UE 1801 and the UE 1801 receives the message, a RRCConnectionSetupComplete message may be transmitted to the gNB 1803 to establish a connection. Alternatively, if the new gNB 1803 receives the resume ID but fails to successfully distinguish the UE 1801, for example, fails to retrieve the UE context from the existing anchor gNB 1802, the connection of the UE may be rejected by transmitting a RRCConnectionRelease message or a RRCConnectionReject to the UE 1801 and the general RRC connection establishment procedure described in FIG. 17 may be attempted again from the beginning.

The new gNB 1803 identifies MAC-I based on the retrieved UE context 1865. The MAC-I is a message authentication code calculated by the UE 1801 for the control message by applying security information of the restored UE context, that is, by applying a security key and a security counter. The gNB 1803 identifies integrity of the message using the MAC-I of the message, the security key and the security counter stored in the context of the UE 1801, and so on. The new gNB 1803 determines setup to apply to the RRC connection of the UE 1801, and transmits a RRCConnectionResume message containing the setup information to the UE 1870. The RRCConnectionResume message may be a control message including RRC context reuse indicator information in the general RRCConnectionRequest message. The RRCConnectionResume message contains various information related to the RRC connection establishment of the UE, similar to the RRCConnectionSetup message. The RRC connection is establishment based on the configuration information indicated in the RRCConnectionSetup message if the UE 1801 receives the general RRCConnectionSetup message, but the RRC connection is establishment (delta configuration) by considering all of the stored configuration information and the configuration information indicated in the control message if receiving the RRCConnectionResume message. In summary, it may determine the configuration information to apply by determining the indicated configuration information as the delta information for the stored configuration information, and update the configuration information or the UE context. For example, an SRB is configured by applying the indicated SRB configuration information if the RRCConnectionResume message includes SRB configuration information, and the SRB is configured by applying SRB configuration information stored in the UE, context if the RRCConnectionResume message includes no SRB configuration information.

The UE 1801 establishes the RRC connection by applying the updated UE context and configuration information, and transmits a RRCConnectionResumeComplete message 1875 to the gNB 1803. It transmits a control message for requesting to release the connection suspend to the MME, and request to reconfigure the S1 bearer as the new gNB 1803 1880 and 1885. The MME 1804 receiving the message instructs the S-GW 1804 to reconfigure the S1 bearer as the new gNB 1803 and to normally process data related to the UE 1801. After the process is completed, the UE 1801 resumes the data transmission and reception in the cell 1890.

In the procedure, if the UE 1801 in the RRC inactive mode/state by disconnecting from the existing anchor gNB 1802 does not move considerably and re-camps on the cell 1802 of the existing anchor gNB, the existing anchor gNB 1803 may not perform the procedures of 1855 and 1860, may only release the connection suspend of the S1 bearer instead of the procedures of 1880 and 1885, retrieve the UE context of the UE 1801 with reference to the resume ID indicated in a third message, and thus reconfigure the connection in a similar method to the above procedures.

If the data transmission and reception stops, the gNB 1803 drives a specific timer and if the data transmission and reception does not resume until the timer expires 1895, the gNB 1803 considers releasing the RRC connection of the UE 1801. The gNB 1803 releases the RRC connection of the UE 1801 according to a specific rule, then stores the UE context, allocates a resume ID while transmitting a control message instructing the UE 1801 to release the RRC connection, and transmits PA or RNA or RAN paging area or CN based paging area configuration information for the UE 1801 to report mobility during the RRC inactive mode/state 1897. The UE 1899 of the RRC inactive mode/state performs a procedure for updating the paging area if it leaves the configured paging area. The paging area configuration information may include paging area identity or RAN area IDs or CN based paging area IDs or a list of cell IDs, and an addition/subtraction indication may be included per cell ID. The addition/subtraction indication may be a 1-bit indication, the cell ID may be added to the paging area if instructing the addition for a specific cell identifier, and the cell ID may be subtracted from the paging area if instructing the subtraction for a specific cell identifier. The RRC message of 1810 may use the RRCConnectionRelease message, or may switch the UE to the RRC inactive mode/state by including configuration information using a newly defined RRC message.

Figure 19:
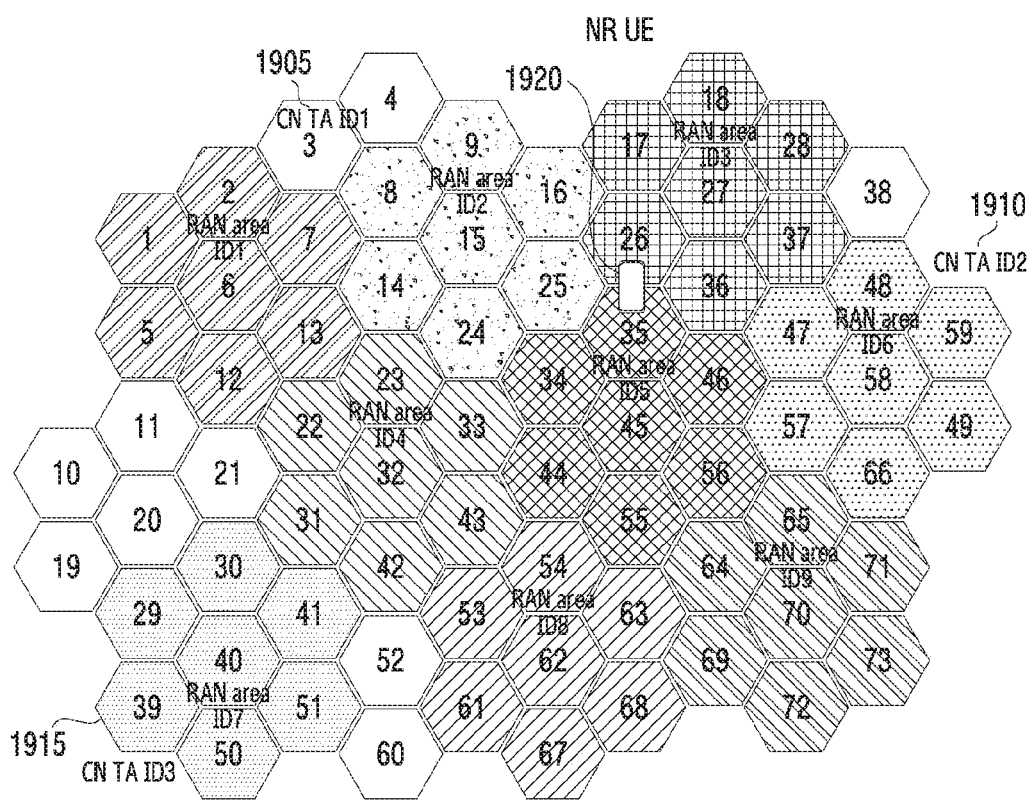
FIG. 19 illustrates an example of paging area configuration of an RRC inactive mode/state UE in a wireless communication system according to various embodiments of the present disclosure.

FIG. 19 illustrates an example of paging area configuration of an RRC inactive mode/state UE in a wireless communication system according to various embodiments of the present disclosure.

In the present disclosure, a method of setting a paging area of an RRC inactive mode/state UE is as follows.

A first paging area provided to the RRC inactive mode/state UE in the NR is a CN based paging area or tracking area. The area is equally provided and applied to the RRC idle mode UE, and the tracking area or the CN based paging area may be indicated as a list of tracking area IDs or a list of new CN based paging area IDs. The gNB may set the paging area of the RRC inactive mode/state UE using the CN based paging area ID or the tracking area ID if setting paging configuration information of the RRC message transmitted in 1810 or 1897 of FIG. 18. The CN based paging area ID may be paging area configuration information set to the RRC idle mode UE, or may be new area configuration information defined by the network (or the MME or the core network). The CN based paging area ID may be broadcast in system information of each cell or may be directly transmitted in the NR CN through a NAS message. That is, if each cell broadcasts the paging area ID with the system information, paging areas 1905, 1910, and 1915 may be logically determined as shown in FIG. 19. The UE receiving the set paging area of the RRC inactive mode/state UE with the CN based paging area IDs may read the system information of each cell while moving, identify CN based paging area ID information in the system information, and if it does not correspond to the set paging area ID, determine out-of-paging area and perform a procedure for updating the paging area. The paging configuration information of the RRC message may include one or more CN based paging area IDs. The paging area setup procedure of the RRC inactive mode/state UE in the first paging area may be performed by the anchor gNB, or may be performed by the MME (or a specific entity of the network). In general, it is a NAS based mobility and paging area management procedure. The anchor gNB may store the context of the UE, and indicate a gNB which manages the mobility of the RRC inactive mode/state UE. An advantage of the above embodiment is to easily set the paging area of the UE with less CN based paging area IDs because the CN based paging area ID may cover a very large area (a plurality of cells). However, because the paging area is considerable, it may take a long time for the network to find the UE by transmitting the paging message, and signaling overhead may occur because the paging message is delivered to many gNBs/cells.

A second paging area provided to the RRC inactive mode/state UE in the NR is a RAN based paging area (RAN notification area or RAN area).

If setting the paging configuration information of the RRC message transmitted in 1810 or 1897 of FIG. 18, the gNB may set the paging area of the RRC inactive mode/state UE by use of the RAN based paging area ID (RAN notification area ID or RAN area ID). The area covered by the RAN based paging area ID may be smaller than the area covered by the CN based paging area ID which may be set in the first paging area. In addition, the RAN based paging area ID may be new area configuration information defined in the network and may be broadcast in the system information of each cell. That is, if each cell broadcasts the paging area ID with the system information, the paging area may be logically determined as shown in FIG. 19. The UE receiving the set paging area of the RRC inactive mode/state UE with the RAN based paging area IDs may read the system information of each cell while moving, identify RAN based paging area ID information in the system information, and if it does not correspond to the set paging area ID, determine out-of-paging area and perform the procedure for updating the paging area. The paging configuration information of the RRC message may include one or more RAN based paging area IDs. The paging area setup procedure of the RRC inactive mode/state UE in the second paging area may be performed by the anchor gNB, or may be performed by the MME (or a specific entity of the network). The anchor gNB may store the context of the UE, and indicate a gNB which manages the mobility of the RRC inactive mode/state UE. An advantage of the second paging area is to easily set the paging area of the UE with relatively less RA based paging area IDs because the RAN based paging area ID may cover a very large area (a plurality of cells). However, because the paging area is a little large, it may take a long time for the network to find the UE by transmitting the paging message, and signaling overhead may occur because the paging message is transmitted to quite many gNBs/cells. However, the paging message may be delivered to the UE faster with less signaling overhead by managing the smaller paging area than the first paging area. In addition, if setting the paging areas, the paging area of the RRC inactive mode/state UE may be configured using a list of cell IDs. The area included in the cell identifier may be the smallest unit for setting the paging area. Hence, the paging area may be set most specifically and most variously. In addition, the cell ID may be new area configuration information defined in the network and may be broadcast in the system information of each cell.

According to various embodiments of the present disclosure, if the paging area is set for the RRC inactive mode/state UE, assuming that the first paging area and the second paging area are changed at the same time as in the example of the UE at the position 1920, that is, assuming a situation changing from CN TA ID1 to CN TA ID2 and RNA ID5 to RNA ID3, the RNA update procedure of the AS level and the CN area update procedure of the NAS level must be independently triggered and independently performed to the UE. However, if the above operation is performed, the state change and the procedure of the UE are different and accordingly unintended state change and operation of the UE may occur. The following embodiment shall describe the problem in detail in the corresponding case.

Figure 20:
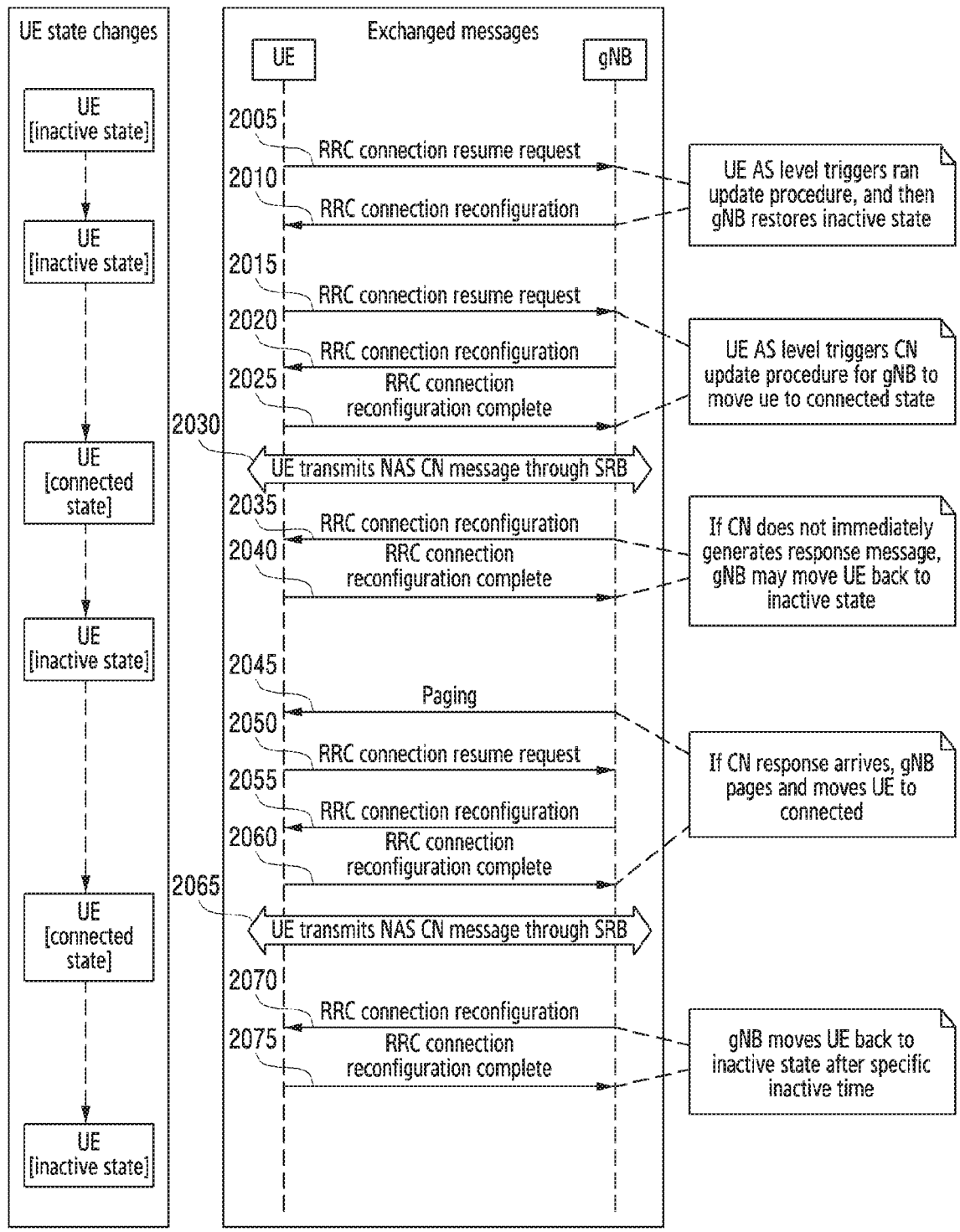
FIG. 20 illustrates an example of operations of an RRC inactive anode/state UE according to various embodiments of the present disclosure.

FIG. 20 illustrates an example of operations of an RRC inactive mode/state UE according to various embodiments of the present disclosure. Specifically, the embodiment of FIG. 20 relates to UE operations if the update operation of two paging areas is simultaneously triggered, if a paging area of the RRC inactive mode/state UE is set to a CN based paging area and a RAN based paging area in the present disclosure.

In FIG. 20, a UE 2001 may switch to the RRC inactive mode/state for a designated cause. The designated cause may be that there is no transmit and receive data for a specific time or the network instructs the corresponding UE to switch to the inactive mode/state. The UE in the UE state may have already received settings for the first paging area (Tracking area or CN based paging area) and the second paging area (RAN notification area, RNA). The first paging area and the second paging area may be set and managed independently, and their size and configuration cells may be different, but the UE may have to perform CN tracking area update (TAU) and RAN notification area update (RNAU) operations at the same time in a particular situation, that is, if boundaries of the first paging area and the second paging area are the same. Since the above two operations are triggered by individual events and are independent operations, the independent operations must be performed if there is no particular cooperation between the gNB and the UE.

If the above two events occur, the UE 2001 may perform the RNA update procedure of the AS level and the UE 2001 transmits a resume request message including the resume ID based on uplink resource information pre-received from a gNB 2003 in step 2005. The message may be a modified message of the RRCConnectionRequest message or a newly defined message, for example, a RRCConnectionResumeRequest message. In addition, the message may add an indication indicating that the UE 2001 request the resume and the corresponding request is for the RNA update to a request cause. The RRC message may attempt to update the tracking area or the paging area by mo-signaling, mobile originated-signaling RRC establishmentCause. In this case, if successfully receiving and identifying the resume ID, the gNB 2003 performs a procedure of retrieving the UE context from the existing gNB, and performs the RNA update for the corresponding UE. In step 2010, the gNB 2003 transmits an RRC connection reconfiguration message, and identifies the RNA update operation. In this operation, the gNB 2003 may provide newly updated RNA ID information, in the AS level RNA update procedure 2005 and 2010, the UE 2001 may not switch to the RRC connected state. This is because the indication indicating the RNA update or the request cause is included if the UE 2001 requests the RRC resume and thus the gNB 2003 does not have to switch the corresponding UE 2001 to the RRC connected state.

The NAS level CN TAU procedure may be performed concurrently with the AS level RNA update procedure 2005 and 2010. That is, the UE 2001 performs the TAU procedure to the MME or the NR CN if moving from the pre-received CN paging area to a new CN paging area 2015, 2020 and 2025. The UE 2001 may transmit to the gNB 2003 a RRCConnectionRequest message or a RRCConnectionResumeRequest message together with the indication indicating the TAU in step 2015, and the gNB 2003 may transmit to the UE 2001 an RRC message including a TAU accept message in step 2020. For example, it may be included in DedicatedInfoNAS of a RRCConnectionReconfiguration message or a DLInformationTrasfer message and delivered to the UE 2001. The RRC message may attempt to update the tracking area or the paging area by mo-signaling or mobile originated-signaling the RRC connection establishmentCause. In this case, a procedure for distinguishing the TAU and RAN update operation requests may be necessary. Next, the UE 2001 transmits to the gNB 2003 a RRCConnectionReconfigurationComplete message indicating that the corresponding TAU accept message is received well, and switches to the RRC connected state. This is for the UE 2001 to deliver the NAS CN message to the MME or the NR CN through the SRB, and for doing so, the UE 2001 must switch to the RRC connected state. If the CN fails to transmit a response message to the UE 2001 within the set inactivity timer in the above step, the UE 2001 may return to the RRC inactive state. The UE 2001 may return to the RRC inactive mode/state and move according to a user's movement. The UE 2001 may leave the set tracking area or paging area due to the mobility, identify the tracking area or paging area ID in the system information of the current cell, and if identifying that it is out of the set tracking area or paging area, perform the tracking area or paging area update procedure. If the CN response message suspended in step 2040 arrives again, the CN delivers the paging to the UE 2001 and re-requests the RRC connection and the CN response message reception from the UE 2001. After downlink data occurs in step 2045 and the paging is received from the gNB 2003, the transition to the RRC connected state and data transmission and reception may be performed 2050, 2055, 2060, and 2065. Next, the gNB 2003 may disconnect the UE 2001 for a specific cause 2070 and 2075. The specific cause may be that the inactivity timer expires because there is no data transmission and reception between the UE 2001 and the network for a specific time. The UE 2001 switches back to the RRC inactive mode/state by the corresponding procedure.

A problematic portion in the embodiment of FIG. 20 may be that the response NAS message of the CN is not delivered at an appropriate time in operation 2040 and thus the state of the UE 2001 transits to the RRC inactive and back to the RRC connected.

Figure 21:
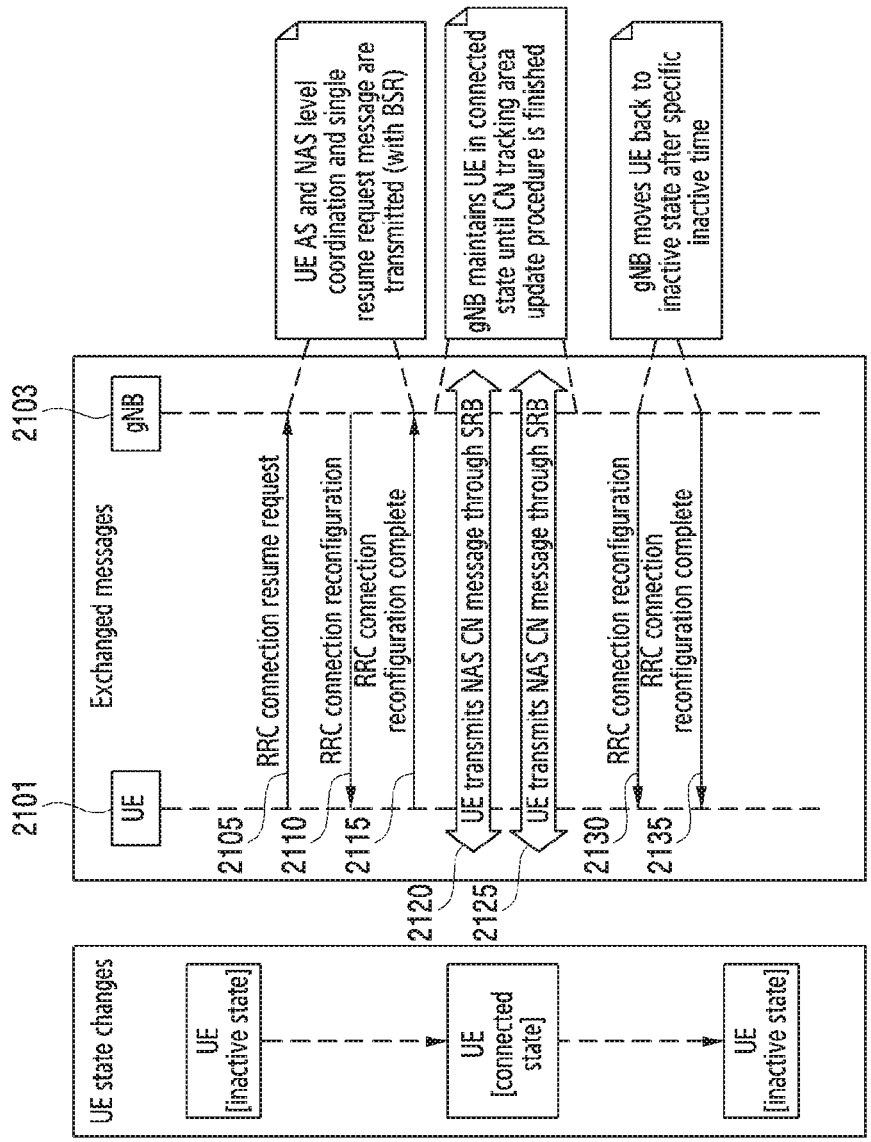
FIG. 21 illustrates an example of operations of an RRC inactive mode/state UE according to various embodiments of the present disclosure.

FIG. 21 illustrates an example of operations of an RRC inactive mode/state UE according to various embodiments of the present disclosure. Specifically, FIG. 21 depicts operations of the UE for updating a corresponding paging area if the CN based paging area and the RAN based paging area of the RRC inactive UE suggested in the present disclosure are updated simultaneously.

A UE 2101 may transit to the RRC inactive mode/state for some cause in FIG. 21. The some cause may be that there is no transmit and receive data for a specific time, or the network instructs the corresponding UE to switch to the inactive mode/state. The UE 2101 in the UE state may have already received the configuration for the first paging area (Tracking area or CN based paging area) and the second paging area (RAN notification area, RNA). The first paging area and the second paging area may be set and managed independently, and their size and configuration cells may be different, but the UE 2101 may have to perform CN TAU and RNAU operations at the same time in a particular situation, that is, if the boundaries of the first paging area and the second paging area are the same. Since the above two operations are triggered by individual events and are independent operations, the independent operations must be performed if there is no particular cooperation between the UE 2101 and a gNB 2103.

If the two events occur, the UE 2101 may independently perform the RNA update procedure and the CN TAU operation of the AS level at the same time. By performing the above procedure as in the embodiment of FIG. 20, the response NAS message of the CN is not transmitted at an appropriate time in step 2040 and thus the state of the UE may switch to the RRC inactive and then to the RRC connected state. Hence, it is necessary to prevent this unwanted operation.

Solutions for addressing the problem in view of the UE may be summarized as follows.

1. In terms of the UE implementation, the operation of the UE is optimized by coordinating at the AS and NAS levels of the UE 2101. That is, if the AS-level RNA update and the NAS-level TAU occur at the same time, the information is shared with each other and corresponding information is delivered as AS and NAS messages, or the UE 2101 itself recognizes that both of the RAN update and the TAU operation should be performed and does not perform unnecessary state transition operation of the UE 2101 until the corresponding operation is conducted.

2. The UE 2101 does not independently transfer the RRC connection resume message for the RNA update and the TAU, but integrates them as one and thus requests the RRC connection from the network. The following solutions may be further required in detail for the corresponding method.

A. If transmitting an RRC Connection Resume Request message, the UE 2101 adds the establishment cause indicating the RAN-Update, and indicates that the NAS data is delivered through the SRB in the corresponding RRC message and concurrently delivers a buffer status report (BSR) requesting required resources therefor. If the gNB 2103 receives the corresponding message, the UE requests the RNA update, and concurrently requests the RRC connection for the TAU.

B. If the NAS-level TAU operation does not occur and only the RNA update occurs, the UE 2101 includes only the establish cause indicating the RAN-Update in transmitting the RRC Connection Resume Request message. That is, it does not add the BSR for the NAS data transmission. In this case, the UE 2101 does not switch to the RRC connected state.

C. If the AS-level RNA operation does not occur and only the TAU operation occurs, the UE 2101 includes only the establish cause indicating mo-signaling or mobile originated-signaling in transmitting the RRC Connection Resume Request message. In this case, the BSR for the NAS data transmission may be added or may not be added.

The establishment cause defined in the step may be configured in other form.

In view of the network, the UE 2101 may identify whether the CN TAU procedure and the RNA update operation occurred at the same time through the above solution, and the corresponding integrated procedure may prevent an unnecessary operation of switching the UE 2101 to the RRC inactive state before the UE 2101 receives the CN response message.

Figure 22:
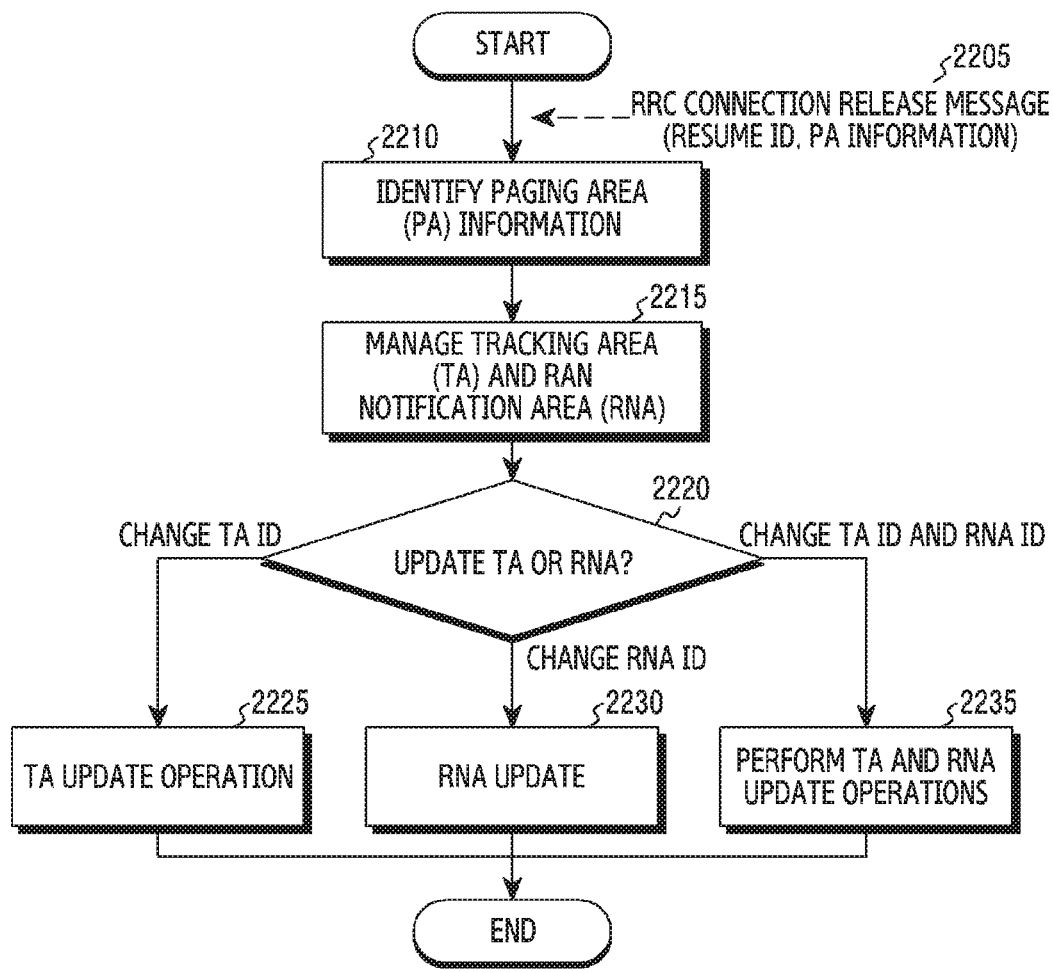
FIG. 22 illustrates an example of operations of an RRC inactive mode/state UE according to various embodiments of the present disclosure.

FIG. 22 illustrates an example of operations of an RRC inactive mode/state UE according to various embodiments of the present disclosure. In detail, FIG. 22 is a diagram of operations of the UE if the RRC inactive mode/state UE proposed in the present disclosure performs a procedure for updating a paging area.

In FIG. 22, a UE 2201 may receive an RRC connection release message or a newly defined RRC message from an eNB and switches to the RRC inactive mode/state. The UE receiving the RRC message identities whether paging configuration information is present 2210. The RRC message may include a UE context identifier and paging area configuration information. In the UE state, the UE may have already received configuration for the first paging area (Tracking area or CN based paging area) and the second paging area (RAN notification area, RNA). The first paging area and the second paging area may be configured and managed independently, and their sizes and configuration cells may be different, but the UE may need to perform the CN TAU and the RNAU at the same time in a specific situation, that is, if the boundaries of the first paging area and the second paging area are the same. Since the above two operations are triggered by individual events and are independent operations, independent operations are unavoidable if there is no specific cooperation between the eNB and the UE. In step 2215, the UE stores the received TA and RNA information and checks the corresponding area. That is, the UE reads system information from the cell as it moves and determines whether the corresponding information is updated.

If the UE has the TA or RNA update in step 2220, the UE performs the TA update operation in step 2225 if only the TA ID is changed to correspond to the TAU. If only the RNA ID is changed in step 2130, the RNA update operation is performed, and if both IDs are changed in step 2235, the TA and the RNA are concurrently updated. The above TA update, RNA update, TA and RNA simultaneous update operations have been described in the embodiment of FIG. 21 of the present disclosure.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for causing the electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored to a memory combining part or all of those recording media. A plurality of memories may be equipped.

In addition, the program may be stored in an attachable storage device accessible via a communication network such as Internet, Intranet, local area network (LAN), wide LAN (WLAN), or storage area network (SAN), or a communication network by combining these networks. The storage device may access the electronic device through an external port. In addition, a separate storage device on the communication network may access the device which fulfills the embodiment of the present disclosure.

In the specific embodiments of the present disclosure, the elements included in the present disclosure are expressed in a singular or plural form. However, the singular or plural expression is appropriately selected according to a proposed situation for the convenience of explanation and the present disclosure is not limited to a single element or a plurality of elements. The elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the present disclosure. Thus, the scope of the present disclosure is not limited and defined by the described embodiment and is defined not only the scope of the claims as below and their equivalents.

The invention claimed is:

1. An operating method of a user equipment (UE) in a wireless communication system, the method comprising:
   transmitting, to a base station (BS), a first radio resource control (RRC) message for requesting a resumption of an RRC connection, the first control message including cause information, wherein the UE is in an RRC inactive state; and
   receiving, from the BS, a second RRC message in response to the first RRC message, wherein the RRC inactive state of the UE is maintained,
   wherein, in case that a tracking area update (TAU) and a radio access network (RAN) notification area (RNA) update are triggered simultaneously, the cause information indicates a mobile originated (MO) signaling, and
   wherein, in case that the TAU is not triggered and the RNA update is triggered, the cause information indicates an update for the RNA.

2. The method of claim 1, wherein the second RRC message comprises information on an updated RNA.

3. An operating method of a base station in a wireless communication system, the method comprising:
   receiving, from a user equipment (UE), a first radio resource control (RRC)_message for requesting a resumption of an RRC connection, the first RRC message including cause information, wherein the UE is in an RRC inactive state; and
   transmitting, to the UE, a second RRC message in response to the first RRC message, wherein the RRC inactive state of the UE is maintained,
   wherein, in case that a tracking area update (TAU) and a radio access network (RAN) notification area (RNA) update are triggered simultaneously, the cause information indicates a mobile originated (MO) signaling, and
   wherein, in case that the TAU is not triggered and the RNA update is triggered, the cause information indicates an update for the RNA.

4. The method of claim 3, wherein the second RRC-message comprises information on an updated RNA.

5. A user equipment (UE) in a wireless communication system, the UE comprising:
   a transceiver; and
   at least one processor,
   wherein the at least one processor is configured to
   transmit, to a base station (BS), a first radio resource control (RRC) message for requesting a resumption of a radio resource control, RRC, connection, the first control message including cause information, wherein the UE is in an RRC inactive state, and
   receive, from the BS, a second RRC message in response to the first RRC message, wherein the RRC inactive state of the UE is maintained,
   wherein, in case that a tracking area update (TAU) and a radio access network (RAN) notification area (RNA)

update are triggered simultaneously, the cause information indicates a mobile originated (MO) signaling, and wherein, in case that the TAU is not triggered and the RNA update is triggered, the cause information indicates an update for the RNA.

6. The UE of claim 5, wherein the second RRC-message comprises information on an updated RNA.

7. A base station (BS) in a wireless communication system, the BS comprising:
    a transceiver; and
    at least one processor,
    wherein the at least one processor is configured to:
        receive, from a user equipment (UE), a first radio resource control (RRC) message for requesting a resumption of an RRC connection, the first RRC message including cause information, wherein the UE is in an RRC inactive state; and
        transmit, to the UE, a second RRC message in response to the first RRC message, wherein the RRC inactive state of the UE is maintained,
    wherein, in case that a tracking area update (TAU) and a radio access network (RAN) notification area (RNA) update are triggered simultaneously, the cause information indicates a mobile originated (MO) signaling, and
    wherein, in case that the TAU is not triggered and the RNA update is triggered, the cause information indicates an update for the RNA.

8. The BS of claim 7, wherein the second RRC message comprises information on an updated RNA.

* * * * *

UNITED STATES PATENT AND TRADEMARK OFFICE
CERTIFICATE OF CORRECTION

| | |
|---|---|
| PATENT NO. | : 11,497,079 B2 |
| APPLICATION NO. | : 17/043234 |
| DATED | : November 8, 2022 |
| INVENTOR(S) | : Sangbum Kim et al. |

It is certified that error appears in the above-identified patent and that said Letters Patent is hereby corrected as shown below:

In the Claims

In Column 28, Line 36 of Claim 3:
"resource control (RRC)_message for requesting a"
Should be:
-- resource control (RRC) message for requesting a --.

In Column 28, Line 57 of Claim 5:
"wherein the at least one processor is configured to"
Should be:
-- wherein the at least one processor is configured to: --.

Signed and Sealed this
Ninth Day of May, 2023

Katherine Kelly Vidal
*Director of the United States Patent and Trademark Office*